(12) United States Patent
Morita et al.

(10) Patent No.: US 6,745,279 B2
(45) Date of Patent: Jun. 1, 2004

(54) MEMORY CONTROLLER

(75) Inventors: Yuichiro Morita, Hitachi (JP); Manabu Jyou, Hitachi (JP); Yasuhiro Nakatsuka, Tokai (JP); Tetsuya Shimomura, Hitachi (JP); Yutaka Okada, Tokyo (JP); Kazushige Yamagishi, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 09/962,257

(22) Filed: Sep. 26, 2001

(65) Prior Publication Data

US 2002/0174292 A1 Nov. 21, 2002

(30) Foreign Application Priority Data

May 21, 2001 (JP) ........................................ 2001-151223

(51) Int. Cl.[7] .............................................. G06F 12/00
(52) U.S. Cl. ........................... 711/105; 711/5; 711/105; 711/154; 711/157; 365/203; 365/204; 365/226; 365/229; 365/235
(58) Field of Search ............................. 711/5, 105, 157, 711/154; 365/203, 204, 229, 226, 235

(56) References Cited

U.S. PATENT DOCUMENTS 5,732,236 A * 3/1998 Nguyen et al. .............. 711/151
5,745,913 A * 4/1998 Pattin et al. ................. 711/105
5,881,016 A * 3/1999 Kenkare et al. ......... 365/230.03
6,181,619 B1 * 1/2001 Bogin et al. ................ 365/203
6,470,416 B2 * 10/2002 Chang ........................ 711/105

FOREIGN PATENT DOCUMENTS

JP    8-255107    10/1996    ........... G06F/12/02

OTHER PUBLICATIONS

English Language Abstract JP8255107 Oct. 1, 1996.

* cited by examiner

Primary Examiner—Donald Sparks
Assistant Examiner—Ngoc V Dinh
(74) Attorney, Agent, or Firm—Antonelli, Terry, Stout & Kraus, LLP

(57) ABSTRACT

A memory controller is disclosed, in which upon receipt of an access request from a device, the memory controller activates a page designated by a row address of a first bank at a predetermined memory cycle, based on the access request. After that, before the read access to a page of the first bank, a second bank next to be accessed is precharged. In the case where a page mishit occurs due to the access from the first bank to the second bank by the graphic processing after the access to the first bank by the read operation, the memory controller activates the second bank immediately without precharging.

13 Claims, 20 Drawing Sheets

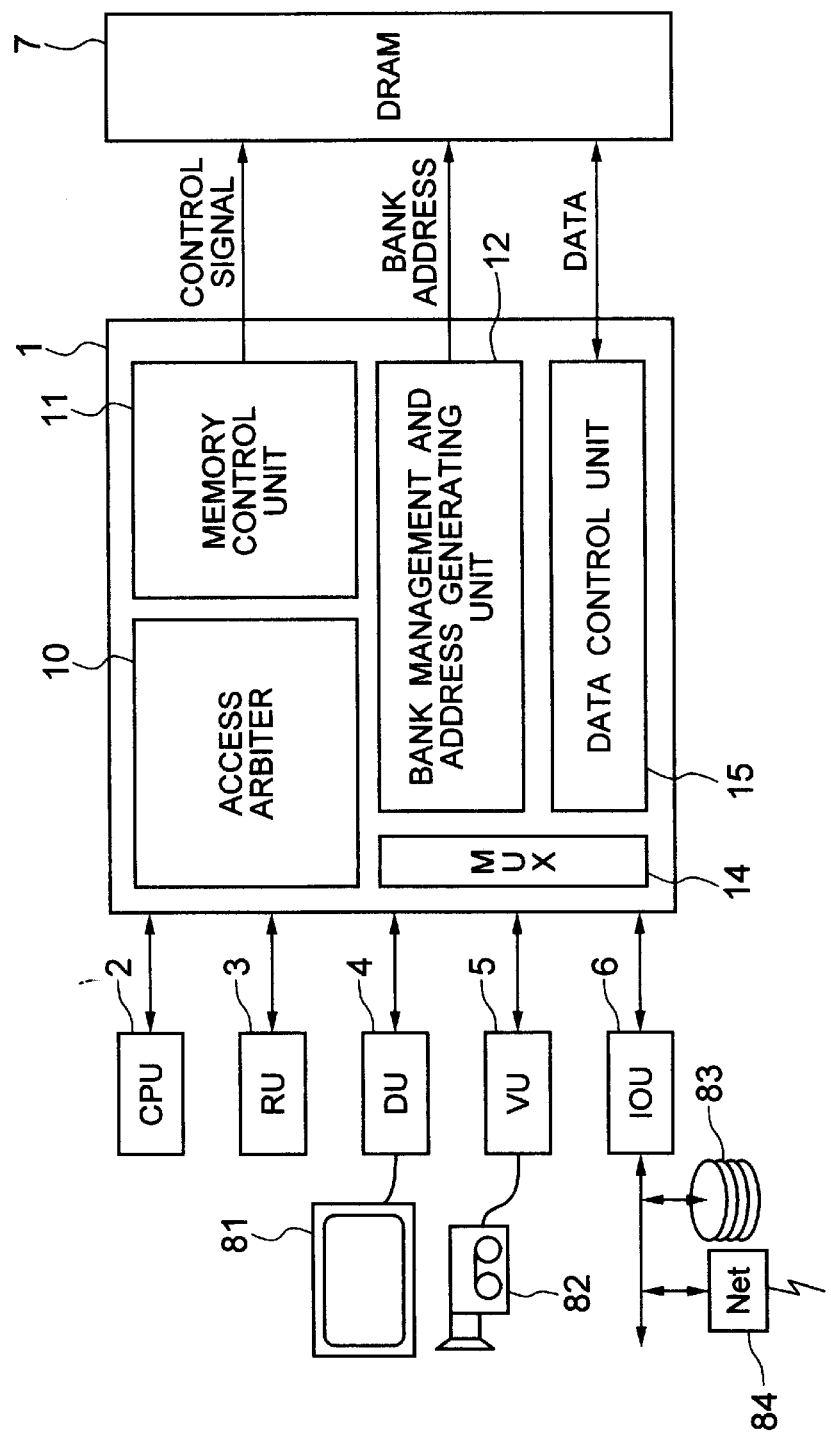

FIG. 2

| | COLUMN ADDRESS | | | | | | | LINE | |
|---|---|---|---|---|---|---|---|---|---|
| BANK ADDRESS : 0 ROW ADDRESS : 0 | 0 | 1 | 2 | ... | 31 | 2 | ... | 510 | 511 |
| BANK ADDRESS : 0 ROW ADDRESS : 0 | 0 | 1 | 2 | ... | 31 | 2 | ... | 510 | 511 |
| BANK ADDRESS : 0 ROW ADDRESS : 0 | 0 | 1 | 2 | ... | 31 | 2 | ... | 510 | 511 |
| | : | : | : | ... | : | : | ... | : | : |
| BANK ADDRESS : 0 ROW ADDRESS : n | 0 | 1 | 2 | ... | 31 | 2 | ... | 510 | 511 |
| BANK ADDRESS : 1 ROW ADDRESS : n | 0 | 1 | 2 | ... | 31 | 2 | ... | 510 | 511 |
| BANK ADDRESS : 2 ROW ADDRESS : n | 0 | 1 | 2 | ... | 31 | 2 | ... | 510 | 511 |
| | : | : | : | ... | : | : | ... | : | : |

FIG. 3

| COLUMN ADDRESS | | | | | | | | | | | | LINE |
|---|---|---|---|---|---|---|---|---|---|---|---|---|
| 0 | 1 | 2 | ... | 31 | 0 | 1 | 2 | ... | 31 | 0 | 1 | 2 | ... | 31 |
| 32 | 33 | 34 | ... | 63 | 32 | 33 | 34 | ... | 63 | 32 | 33 | 34 | ... | 63 |
| 64 | 65 | 66 | ... | 95 | 64 | 65 | 66 | ... | 95 | 64 | 65 | 66 | ... | 95 |

| BANK ADDRESS : 0 ROW ADDRESS : 0 | BANK ADDRESS : 1 ROW ADDRESS : 0 | BANK ADDRESS : 2 ROW ADDRESS : 0 |
|---|---|---|
| 496 497 498 ... 511 | 496 497 498 ... 511 | 496 497 498 ... 511 |
| BANK ADDRESS : 1 ROW ADDRESS : m | BANK ADDRESS : 2 ROW ADDRESS : m | BANK ADDRESS : 3 ROW ADDRESS : m |
| BANK ADDRESS : 2 ROW ADDRESS : n | BANK ADDRESS : 3 ROW ADDRESS : m | BANK ADDRESS : 0 ROW ADDRESS : m |
| | | |

FIG. 6

| PRa[2:0] | PRb[2:0] | PRc[2:0] | PRd[2:0] | PRe[2:0] | CL2 | PDa | PDb | PDc | PDd | PDe |
|---|---|---|---|---|---|---|---|---|---|---|
| 000 | 001 | 010 | 011 | 010 | 1 | 0 | 1 | 0 | 0 | 1 |

MODE REGISTER SETTING EXAMPLE:

FIG. 7

| PRi[2:0] | PRIORITY |
|---|---|
| 000 | PRIVILEGE MODE |
| 001 | PRIORITY : HIGH |
| 010 | ↑ |
| 011 | |
| 100 | |
| 101 | |
| 110 | ↓ |
| 111 | PRIORITY : LOW |

FIG. 12

| CONF[3:0] | ACTISS | PPREISS | PALLISS | BADR[1:0] | RA[12:0] | MADR[12:0] |
|---|---|---|---|---|---|---|
| 0 | 0 | 0 | 0 | ADR[11:10] | {0, ADR[23:12]} | {00000, ADR[9:2]} |
|   | 1 | 0 | 0 | ADR[11:10]+1 |  | {0, ADR[23:12]} |
|   | 0 | 1 | 0 | ADR[11:10] |  | {00000, ADR[9:2]} |
|   | 0 | 0 | 1 | ADR[12:11] |  | {00100, ADR[9:2]} |
| 1 | 0 | 0 | 0 | ADR[12:11] | {0, ADR[24:13]} | {0000, ADR[10:2]} |
|   | 1 | 0 | 0 | ADR[12:11]+1 |  | {0, ADR[23:12]} |
|   | 0 | 1 | 0 | ADR[12:11] |  | {0000, ADR[10:2]} |
|   | 0 | 0 | 1 | ADR[12:11] |  | {0010, ADR[10:2]} |
| 2 | 0 | 0 | 0 | ADR[12:11] | ADR[25:13] | {0000, ADR[10:2]} |
|   | 1 | 0 | 0 | ADR[12:11]+1 |  | {0, ADR[23:12]} |
|   | 0 | 1 | 0 | ADR[12:11] |  | {0000, ADR[10:2]} |
|   | 0 | 0 | 1 | ADR[12:11] |  | {0010, ADR[10:2]} |

FIG. 16

| # | TRANSITION SOURCE | TRANSITION DESTINATION | TRANSITION CONDITIONS |
|---|---|---|---|
| a | IDLE | ACTV | RDY & ¯IRP |
| b | IDLE | IDLE | (otherwise) |
| c | ACTV | PRE-A | PDEV |
| d | ACTV | WAIT-B | ¯PDEV & RCD2 |
| e | ACTV | WAIT-A | (otherwise) |
| f | WAIT-A | WAIT-B | (everything) |
| g | PRE-A | WRITE | CL2 & WR & OUTENB |
| h | PRE-A | READ | CL2 & ¯WR |
| i | PRE-A | WAIT-B | (otherwise) |
| j | WAIT-B | WRITE | WR & OUTENB |
| k | WAIT-B | READ | RDY & ¯WR |
| l | WAIT-B | WAIT-B | (otherwise) |
| m | WRITE | WRITE | RDY & PHIT & WR |
| n | WRITE | READ | RDY & PHIT & ¯WR |
| o | WRITE | ACTV | RDY & ¯PHIT & ¯BACT & IRP |
| p | WRITE | PRE-B | RDY & ¯PHIT & BACT & IRAS |
| q | WRITE | WAIT-C | (otherwise) |
| r | READ | READ | RDY & PHIT & ¯WR |
| s | READ | WAIT-B | RDY & PHIT & WR |
| t | READ | ACTV | RDY & ¯PHIT & ¯BACT & IRP |
| u | READ | PRE-B | RDY & ¯PHIT & BACT & IRAS |
| v | READ | WAIT-C | (otherwise) |
| w | WAIT-C | WRITE | RDY & PHIT & WR & ¯OUTENB |
| x | WAIT-C | READ | RDY & PHIT & ¯WR |
| y | WAIT-C | ACTV | RDY & ¯PHIT & ¯BACT & IRP |
| z | WAIT-C | PRE-B | RDY & ¯PHIT & BACT & IRAS |
| AA | WAIT-C | PALL | ¯RDY & IRASALL |
| AB | WAIT-C | WAIT-C | (otherwise) |
| AC | PRE-B | IDLE | (everything) |
| AD | PALL | IDLE | (everything) |

FIG. 17

| TRANSITION DESTINATION STATUS | OUTPUT SIGNAL | | | | | | | | | | |
|---|---|---|---|---|---|---|---|---|---|---|---|
| | ACK | ACTISS | PREISS | PPREISS | PALLISS | WRITEISS | READISS | cs# | ras# | cas# | we# |
| IDLE | 0 | 0 | 0 | 0 | 0 | 0 | 0 | 1 | 1 | 1 | 1 |
| ACTV | 0 | 1 | 0 | 0 | 0 | 0 | 0 | 0 | 0 | 1 | 1 |
| WAIT-A | 0 | 0 | 0 | 0 | 0 | 0 | 0 | 0 | 1 | 1 | 1 |
| WAIT-B | 0 | 0 | 0 | 0 | 0 | 0 | 0 | 0 | 1 | 1 | 1 |
| PRE-A | 0 | 0 | 0 | 1 | 0 | 0 | 0 | 0 | 0 | 1 | 0 |
| WRITE | 1 | 0 | 0 | 0 | 0 | 1 | 0 | 0 | 1 | 0 | 0 |
| READ | 1 | 0 | 0 | 0 | 0 | 0 | 1 | 0 | 1 | 0 | 1 |
| WAIT-C | 0 | 0 | 0 | 0 | 0 | 0 | 0 | 0 | 1 | 1 | 1 |
| PRE-B | 0 | 0 | 1 | 0 | 0 | 0 | 0 | 0 | 0 | 1 | 0 |
| PALL | 0 | 0 | 0 | 0 | 1 | 0 | 0 | 0 | 0 | 1 | 0 |

FIG. 18

| WRITEISS | OUTPUT SIGNAL | | | |
|---|---|---|---|---|
| | DQM3 | DQM2 | DQM1 | DQM0 |
| 0 | 0 | 0 | 0 | 0 |
| 1 | ¯BE[3] | ¯BE[2] | ¯BE[1] | ¯BE[0] |

MEMORY CONTROLLER

BACKGROUND OF THE INVENTION

The present invention relates to a memory controller, or in particular to a memory controller suitable for accessing a dynamic random access memory (DRAM) for storing image data or the like.

In recent years, with rapid extension of ownership of personal computers or the like, an increased number of DRAMs have been supplied as a main memory of the personal computers. At the same time, the price of the DRAM has decreased to such an extent that it has come to be employed also for an electronic equipment other than personal computers. The DRAM includes a synchronous DRAM (hereinafter referred to as SDRAM) which can be continuously written into and read from at higher speed in synchronism with the clock of an interface (hereinafter referred to as the burst transfer), a double data rate SDRAM (hereinafter referred to as DDR-SDRAM) having a burst transfer increased to a double speed by executing the burst transfer of the SDRAM in synchronism with both the leading edge and the trailing edge of the clock signal, and a Rambus DRAM (hereinafter referred to as RDRAM). Of these DRAMs, SDRAM can constitute an inexpensive, large-capacity memory, and therefore has come to be employed by more and more equipment. The SDRAM also has come to be used in place of the conventional expensive dedicated memory (VRAM) as a frame memory for temporarily holding the image data displayed on a display unit. The SDRAM are regulated by JEDEC Standard 21-C.

Examples of devices for accessing image data of the SDRAM include a display processing device for reading and transferring image data to a display unit and a graphic processing device for generating graphics data and writing them as image data to draw arbitrary graphics. The image data generated by a video input device can also be written and stored in the SDRAM. Further, a SDRAM can be configured as a unified memory in which a main memory and a frame memory for storing image data are integrated into a single memory. With an SDRAM configured as a unified memory, not only image data but also instruction codes and various data are accessed by processors, and therefore an efficient memory access is required.

In storing image data in a frame memory, the image data is assigned to a two-dimensional address space which is finite in horizontal and vertical directions in order to hold the image data in a data storage area. The image data are held as an arrangement in horizontal and vertical directions corresponding to a display screen (display pixels) of a display device. The image data of each pixel corresponding to the display screen is configured of several to several tens of bits, and the bit length of the image data of one pixel is determined by the data format.

In storing image data in the SDRAM as a frame memory, on the other hand, the data storage area is divided into a plurality of, say four, banks, each of which is in turn divided into several pages, and each page is assigned a row address. In setting an address in the frame memory having this configuration, the linear address mapping and the tile address mapping are employed.

The linear address mapping is a method in which assuming that a horizontal arrangement of pixel data is a line, the pixel data arranged in horizontal direction (image data corresponding to the pixels of the display screen arranged in horizontal direction) are assigned horizontally continuous addresses and all the display pixels in a line are assigned the same row address, i.e. the row address of the same page. In this case, the pixel data of a different line is assigned a different row address of the same bank, or the row address of a different bank. In other words, the pixel data of a different line are assigned a different page.

The tile address mapping, on the other hand, is a method in which the pixel data in a rectangle (hereinafter referred to as the tile) having 32 bytes in horizontal direction and 16 lines in vertical direction are assigned continuous addresses, and all the pixel data in each tile are assigned the same row address, i.e. the same page. In this case, the pixel data (image data) of a different tile are assigned a different row address of the same bank, or the row address of a different bank. In other words, the pixel data of a different tile are assigned a different page.

The SDRAM requires the refresh operation for holding data, and in accessing the SDRAM, the page to be accessed is designated by a row address, and all the data belonging to the designated page are activated by being transferred to and amplified by a sense amplifier. Of the data thus activated, only the data designated by a column address are accessed by the read or write operation. In this case, the data of the same page can be continuously accessed. For different pages, however, all the data in the sense amplifier are required to be precharged by being returned to the original page, after which all the data belonging to the page to be accessed are activated by being transferred to and amplified by a sense amplifier.

In this way, the data belonging to the same page can be continuously accessed, and therefore the access efficiency can be improved. When accessing a different page, however, a page mishit occurs. In this case, the page to be accessed is precharged and activated before being accessed, resulting in a lower memory access efficiency. In accessing the SDRAM, therefore, a page mishit is desirably reduced, and in setting the address mapping in the SDRAM, the requirements of the device functions must be met.

Specifically, assume an application of the linear address mapping to the SDRAM used for a display processing device. In view of the fact that the display processing device makes access in one direction either from left to right or from right to left on a line, a page mishit is not caused and can be suppressed as long as the same line is being accessed. In an application of the tile address mapping to the SDRAM used for the display processing device, however, a page mishit is often caused. This is by reason of the fact that the display processing device can start access with an arbitrary address, and the scroll of the image displayed and the boundaries of a plurality of display image planes (hereinafter referred to as the planes) are set at arbitrary positions. An access from the display processing device to the pixel data continuous along a line of the SDRAM using the tile address mapping, therefore, goes over the tile boundary (the boundary between tiles). Thus, a page mishit occurs each time a tile boundary is crossed, resulting in a reduced memory access efficiency.

In the case where a graphic processing device accesses the SDRAM using the linear address mapping, in contrast, the continuous access is possible and the page mishit can be reduced for horizontal drawing. In the case of vertical or diagonal plotting, however, a different page is accessed for each cycle, and therefore a page mishit occurs for each drawing cycle, thereby reducing the memory access efficiency.

Specifically, the graphic processing device is adapted to generate arbitrary graphics in accordance with a draw instruction code given and write the image data on the generated graphics in a two-dimensional address space of the SDRAM. Also, the graphics drawn are configured of straight lines and curves of arbitrary angles. Therefore, the addresses to be accessed are continuous in horizontal direction, in vertical direction or in diagonal direction. As a result, as long as the tile address mapping is set in the SDRAM used for the graphic processing device, a page mishit occurs only when crossing a tile boundary regardless of the direction of access, horizontal, vertical or diagonal. It is therefore possible to reduce the page mishit more than when using the linear address mapping. For this reason, the tile address mapping is more preferable for the graphic processing, and many equipment with a frame memory realized by the SDRAM employ the tile address mapping.

A sort of real time operation is required for reading image data by the display processing device. Specifically, unless the read operation of the image data is completed within a predetermined time, the image displayed on the display unit comes to flicker. For preventing the image flicker, the arbitration of accesses to the SDRAM is important as well as improving image data access efficiency by suppressing the page mishit of the SDRAM. Especially, the unified memory configuration often causes the contention between the access from the graphic processing device and the accesses from other devices such as processors. Therefore, how to suppress the delay of image data access due to the access contention is crucial.

A method for accessing a SDRAM efficiently as a frame memory is proposed in JP-A-8-255107. In this method, the address to be accessed is compared with the address of the preceding access to decide on a page hit. In the case where a page mishit occurs, the bank is precharged and a new page is activated. Then, the write or read operation is executed. In the case of a page hit, on the other hand, the write or read operation is executed immediately without bank precharge or page activation. Further, an address counter is included which is incremented successively by a predetermined unit count. Thus, it is possible for the display processing device to read the image data efficiently by suspending access to a given page immediately before access to a different page when the different page is to be accessed while the given page is being continuously accessed.

In JP-A-8-255107, however, the address to be accessed and the address of the preceding access are simply compared with each other for page hit decision of the SDRAM. Therefore, the interleave access to a plurality of banks (a method of distributing the accesses to a plurality of banks to improve the access efficiency by individual activation of the pages of each of two or four banks) which is the feature of the SDRAM cannot be utilized for improving the access efficiency.

Also, according to JP-A-8-255107, for reading the image data by the display processing device, in the case where a different page is accessed while the data of a given page are being continuously accessed, a page mishit is prevented by suspending the ongoing access. When executing the succeeding access, however, a page mishit occurs after all, and therefore the precharge and the activation of the banks are not avoidable.

Further, JP-A-8-255107 fails to take into consideration the arbitration to meet the requirement for the real time operation by the display processing device in the case where a plurality of accesses compete with each other.

SUMMARY OF THE INVENTION

The object of the present invention is to provide a memory controller making possible efficient access to a dynamic random access memory.

In order to achieve the object described above, according to the present invention, there is provided a memory controller comprising means for receiving a request for accessing a dynamic random access memory having a data storage area divided into a plurality of banks each divided into a plurality of pages, and memory control means for activating the page to be accessed, based on the access request and, before executing the access to the activated page, executing the advance precharge of the page to be accessed subsequently.

In the memory controller according to this invention, after activation of the page to be accessed and before accessing the activated page, the bank or the page to be accessed next or subsequently is precharged in advance. When accessing the bank or the page to be accessed next or subsequently, therefore, the particular bank or the page, as the case may be, is not required to be precharged and can be accessed by the read or write operation after activation without precharge. Even in the case where a different page is accessed due to a page mishit, therefore, the time is saved after precharge to activation. Thus, the time overhead can be shortened and an efficient access can be achieved. As a result, the data amount accessible per unit time can be increased thereby contributing to an improved band width.

On the other hand, assume that while an access request from a given processor unit is selected and under execution, an access request of higher priority, e.g. an access request of higher requirement for real time operation is newly input and access requests from a plurality of processor units (devices) contend each other. The access based on the selected access request is suspended, and the newly input access request is given priority of access. Even in the case where a plurality of access requests contend each other, therefore, an access request of higher priority (access request of higher requirement for real time operation) can be executed in priority, thereby suppressing the access delay for image data which otherwise might be caused by the contention between access requests.

In the case where the advance precharge is not conducted, on the other hand, the status of the dynamic random access memory is managed in such a manner that an access is executed in accordance with the status of the memory. Therefore, the memory can be accessed positively in accordance with the memory status. Further, in the case where the advance precharge is not conducted and a page mishit is caused, the precharge and activation are carried out within the shortest timing in keeping with the minimum cycles between activation and precharge and the minimum cycles between precharge and activation by reference to the information on the active flag, the row address buffer RAS counter and the RP counter.

BRIEF DESCRIPTION OF THE DRAWINGS

FIG. 1 is a diagram showing a block configuration of an image processing system employing a memory controller according to this invention.

FIG. 2 shows a configuration for explaining the linear address mapping of image data.

FIG. 3 shows a configuration for explaining the tile address mapping of image data.

FIG. 6 is a diagram showing an example of the setting of the mode register of the access arbiter.

FIG. 7 is a configuration diagram for explaining the order of priority in the access arbiter.

FIG. 12 is a diagram showing an example of address generation in the address generator.

FIG. 16 is a diagram for explaining the state transition conditions for controlling the command issue in the command generator.

FIG. 17 is a diagram for explaining the output signal state due to the status transition for controlling the command issue in the command generator.

FIG. 18 is a diagram for explaining an example of generation of a byte enable signal in a DQM generator.

DESCRIPTION OF THE EMBODIMENTS

Figure 4:
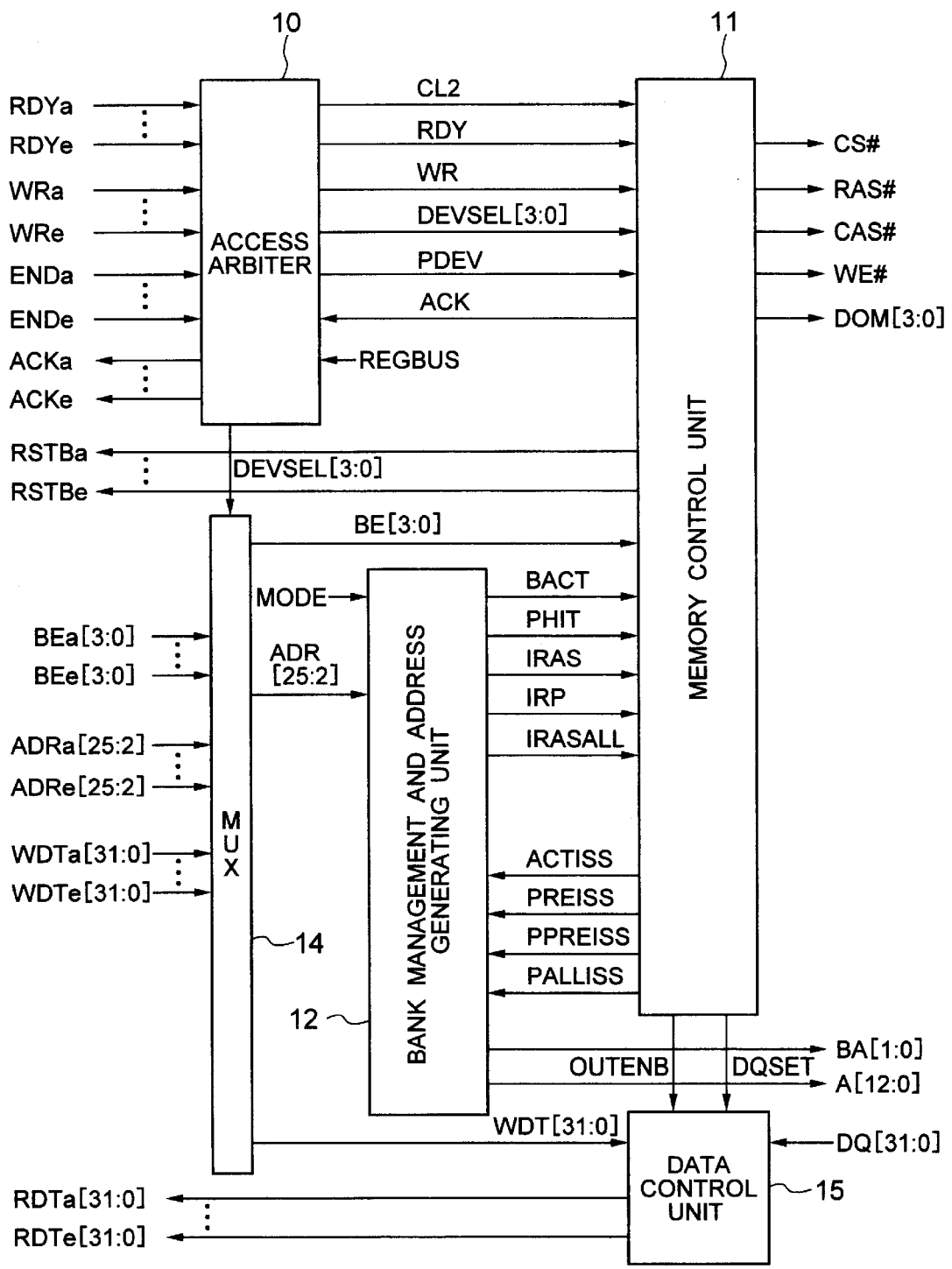
FIG. 4 is a block diagram showing a memory controller according to this invention.

An embodiment of the invention will be explained below with reference to the accompanying drawings. FIG. 1 is a diagram showing a system configuration for application of a memory controller according to the invention to an image processing system. In FIG. 1, the image processing system is a graphics card built in a personal computer or a car navigation system mounted on an automobile, for example, and comprises a memory controller 1, a plurality of processing units and a single memory.

The plurality of the processing units include a processor (hereinafter referred to as the CPU) 2 for executing the sequence processing and data processing, a graphic processing unit (hereinafter referred to as the RU) 3 for executing a two-dimensional or a three-dimensional graphic processing, a display processing unit (hereinafter referred to as the DU) 4 for transferring the display image data to a display unit 81, a video processing unit (hereinafter referred to as the BU) 5 for retrieving video image data from a video camera unit 82 and an input/output control unit (hereinafter referred to as the IOU) 6 for controlling data transfer to and from the peripheral equipment such as an external storage unit 83 and a communication unit 84. A memory 7 shared by all these units is configured of a SDRAM. The memory 7 may alternatively be a double data rate (DDR) DRAM capable of faster access than the SDRAM.

The memory (dynamic random access memory) 7 has a data storage area divided into, for example, a plurality of banks, each of which in turn is divided into a plurality of pages, and each page is assigned to a bank different from that for adjacent pages. Each page of the memory 7 has stored therein the instruction codes and data processed in the CPU 2, the draw instruction codes and the graphic data processed in the RU 3, the display image data read from the DU 4 and the video image data written from the VU 5. The instruction codes and the data are written or read by the peripheral equipment through the IOU 6.

The system configuration can be implemented with a single LSI by integrating the memory controller 1, the RU 3, the DU 4, the VU 5 and the IOU 6. The CPU 2 may also be added to and integrated with these component parts to implement a single LSI. Further, the memory 7 may be added to realize a single LSI. The processing units including the CPU 2, the RU 3, the DU 4, the VU 5 and the IOU 6 by which the memory is accessed will hereinafter be referred to as the devices by way of explanation.

The memory controller 1, upon receipt of access requests from the devices, arbitrates them for selecting one of the access requests, generates a command based on the selected access request, and executes the read or write operation (access) for the memory 7 in accordance with the command. Specifically, the memory controller 1 comprises an access arbiter 10, a memory control unit 11, a bank management and address generator 12, a multiplexer (hereinafter referred to as the MUX) 14 and a data control unit 15.

The access arbiter 10, upon receipt of access requests from a plurality of devices which contend each other, is adapted to determine the order in which the memory is accessed, based on a predetermined priority order. The memory control unit 11 generates a command based on the access request from a device determined by the access arbiter 10, and thus controls the operation of reading from or writing into the memory 7 in accordance with a control signal based on the particular command. In this case, since the memory 7 presupposes a SDRAM, the control operation is performed in accordance with the read and write sequence of the SDRAM. The bank management and address generator 12, upon receipt of the command from the memory control unit 11, manages the status of the memory 7 in accordance with the command, and at the same time, in order to select a bank and a page to be accessed based on the access request from the device selected by the access arbiter 10, generates a bank address, a row address and a column address, holds the information required to optimize the access to the memory 7 and outputs the information thus held to the memory control unit 11. The MUX 14 selects the address and the data of the device selected by the access arbiter 10, and outputs the selected data to the bank management and address generator 12, etc. The data control unit 15 is adapted to temporarily hold the data to be written into the memory 7 or the data read from the memory 7.

To the address space of the memory 7, there is allocated a horizontally and vertically finite two-dimensional address space to hold the graphic data, the display image data and the video image data. The graphic data, the display image data and the video image data are each configured of several bits or several tens of bits per pixel. These data, when stored in the memory 7, are aligned in horizontal and vertical directions in the same manner as if a corresponding image is displayed on the screen of the display unit. The bit length of data of one pixel is determined by the data format.

In storing the graphic data, the display image data and the video image data in the memory 7, the linear address mapping method or the tile address mapping method can be employed. In the case where the linear address mapping method is employed by dividing the memory 7 into four banks (bank addresses 0 to 3) and dividing each bank into n pages, for example, as shown in FIG. 2, each line is allocated to a page, horizontally continuous addresses are allocated to each line, and the pixel data in each line are allocated to the same row address, i.e. the same page. To each line, however, there is allocated a different row address of the same bank or a row address of a different bank. Specifically, each line is allocated with a different page. In this case, the column addresses (0 to 511) correspond to the pixels of the screen, respectively.

In the case where the tile address mapping method is employed by dividing the memory 7 into four banks, on the other hand, as shown in FIG. 3, each page is set as a rectangle (hereinafter referred to as the tile) having 32 bytes in horizontal direction and 16 lines in vertical direction. Each tile is allocated with continuous addresses (0 to 511), and all the pixel data in each tile are allocated to the same row address, i.e. the same page. Each tile, however, is allocated with a different row address of the same bank or a row address of a different bank. In other words, each tile is allocated to a page of a different address from adjacent tiles.

In employing the linear address mapping method or the tile address mapping method, it is necessary to take the functions of each device into consideration.

The RU 3, for example, is adapted to generate arbitrary graphics in accordance with a draw instruction code and write the graphics into the two-dimensional address space of the memory 7. Since the graphics drawn are configured of straight lines and curves of an arbitrary angle, the addresses to be accessed are continuous in horizontal, vertical or diagonal direction. In the linear address mapping, therefore, continuous access is possible for horizontal drawing, but the vertical or diagonal drawing requires the access to a different page of the memory 7 for each cycle, so that a page mishit occurs for each cycle, thereby leading to a lower memory access efficiency.

In the case where the tile address mapping method shown in FIG. 3 is employed, on the other hand, a page mishit is caused only when the tile boundary is crossed regardless of whether the access is horizontal, vertical or diagonal. For the graphic processing, therefore, the tile address mapping shown in FIG. 3 is desirably employed.

The display image data are read from the memory 7 by the DU 4 and the video image data are written into the memory 7 by the VU 5 under a predetermined rule. Specifically, both devices are adapted to access the memory 7 along a line continuously in one direction, either from left to right or from right to left. The address to start the access with, however, is arbitrary. This is attributable to the scroll of the display image, or the control operation of the transfer data buffer in the DU 4 or the VU 5. In the case where the tile address mapping is employed for the DU 4 and the VU 5 and the continuous access along a line over the tile boundary is requested, therefore, a page mishit occurs each time the tile boundary is crossed. Unless the access is efficient at the time of a page mishit, the memory access efficiency is deteriorated.

The operation of reading the display image data by the DU 4 or the operation of writing the video image data by the VU 5, on the other hand, requires a sort of the real time processing. Specifically, unless the display image data are completely read within a predetermined length of time, the image displayed on the display unit flickers. In the case where the video image data are not completely written within a predetermined length of time, on the other hand, the video image displayed on the display unit becomes temporarily still. For accessing the memory 7, therefore, it is crucial not only to improve the access efficiency of the display image data and the video image data by suppressing the effect of a page mishit but also to arbitrate the access requests from the devices as well.

Especially in the case where the memory 7 is shared by the devices as a unified memory, the access requests from the devices frequently contend each other, and therefore it is crucial how to suppress the access delay of the display image data and the video image data which may be caused by the access request contention.

For this reason, the memory controller 1 according to this embodiment is so configured as not only to perform the processing for suppressing the effect of a page mishit but also to perform the processing for suppressing the access delay of the display image data and the video image data in case of contention of accesses from a plurality of devices. For this purpose, the memory controller 1, as shown in FIG. 4, is supplied with various signals from the devices through interfaces. The memory controller 1 and the devices are connected to each other through independent interfaces, respectively, which have the same specification. Each interface is implemented with the following signals, where i (=a, . . . ,e) is an identifier of each device.

The access arbiter 10, as shown in FIG. 4, is supplied with a ready signal (RDYi), a write/read discrimination signal WRi and a last cycle discrimination signal ENDi from each device, and an acknowledge signal (ACKi) is output from the access arbiter 10 to each device. The MUX 14 is supplied from each device with a byte enable signal BEi [3:0], an access destination address ADRi [25:2] and write data WDTi [31:0]. On the other hand, a read data strobe signal RSTBi is output from the memory control unit 11 to each device, and the data control unit 15 outputs read data RDTi [31:0] to each device. Further, the memory controller 1 and the memory 7 are connected to each other through a SSDRAM interface. Thus, the memory control unit 11 outputs to the memory 7 the control signals for designating a command, including a chip select signal CS#, a row address strobe signal RAS#, a column address strobe signal CAS#, a write enable signal WE# and a data mask signal DQM [3:0] for masking specific data. Also, the bank management and address generating unit 12 outputs to the memory 7 a bank address BA [1:0] and a row/column address A [12:0] for selecting the bank and the page to be accessed, and the read/write data DQ [31:0] are exchanged between the data control unit 15 and the memory 7. Character # designates a signal of negative logic. In this embodiment, only the signals required for explanation are described.

Figure 21:
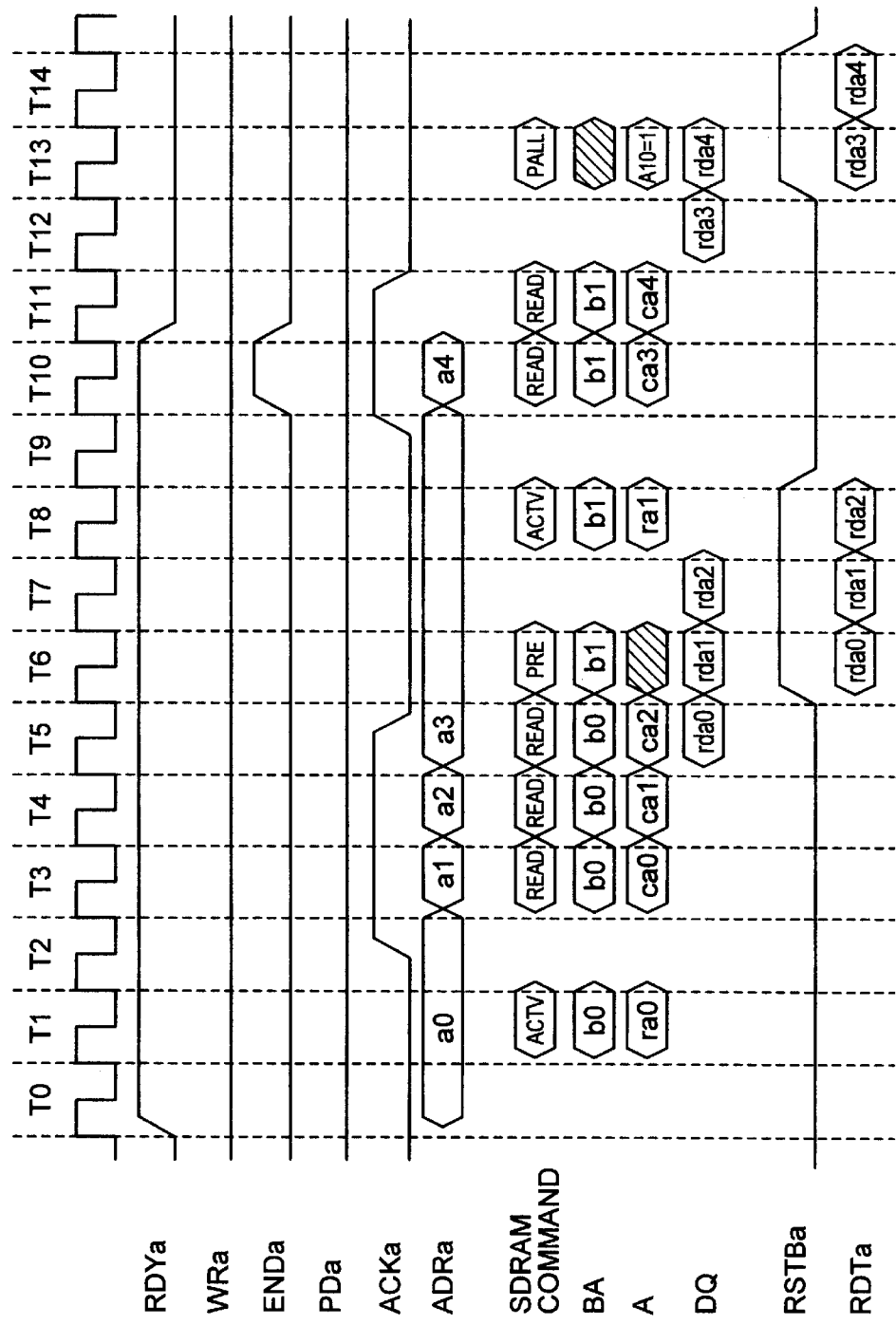
FIG. 21 is a time chart for memory access in the case where the advance precharge is not carried out in the memory controller according to this invention.

A signal indicating a memory read access or a memory write access is output from each device to the memory controller 1 as an access request in synchronism with a clock, as shown in FIG. 21. In this case, the memory access is executed in units of four bytes equal to the data width. The cycle in which the 4-byte memory access is executed is called an access cycle. The shortest access cycle is one clock cycle, but may require 2 or more clock cycles in the case where the devices contend each other or depending on the activation or precharge of the banks of the memory 7. The transmission and receipt of the memory access address (also including the write data and the byte enable signal in the case of the write access) are executed independently of the transmission and receipt of the read data. Without waiting for the return of the read data, therefore, the next access request can be accepted. Each device, when issuing a memory access request, asserts the read signal RDYi (to high level of "1"), while at the same time outputting the first access address ADRi. In the case where the access length is not more than 4 bytes, the first access cycle is the last access cycle, and therefore the last cycle discrimination signal ENDi is also asserted with the read signal RDYi. In the case of the write access, the ready signal RDYi is asserted while at the same time asserting the write/read discrimination signal WRi. Also, the first write data WDTi and the byte enable signal BEi are output. In the case of the read access, on the other hand, the ready signal RDYi is asserted, while at the same time negating the write/read discrimination signal WRi (to low level of "0"). In the case of the read access, neither the write data WDTi nor the byte enable signal BEi is required to be output.

The memory controller 1, upon detection of the assertion of the ready signals RDYi from the devices, selects by arbitration an access from one of the plurality of the devices, and retrieves the address ADRi of the destination of the particular access. In the case where the read/write discrimination signal WRi is asserted, the write data WDTi and the byte enable signal BEi are also retrieved. An acknowledge signal ACKi is asserted for the selected device. The acknowledge signal ACKi is asserted, in the shortest case, within the same clock cycle as the one in which the assertion of the ready signal RDYi is started. As described above, however, the assertion of the acknowledge signal ACKi may be delayed one or more clock cycles due to the contention with other devices or depending on the activation or precharge of the banks of the memory 7. In such a case, the devices hold the output status of each signal until the acknowledge signal ACKi is asserted. Once the device acknowledge signal ACKi is asserted, the next address ADRi is output with the ready signal RDYi asserted in the next clock cycle (A1). This is also the case with the signals WRi, WDTi and BEi. The access address ADRi may not be continuous with the preceding address value. Also, in the last access cycle, the last cycle discrimination signal ENDi is also asserted.

The memory controller 1 accepts the last access cycle (asserts the acknowledge signal ACKi) for which the last cycle discrimination signal ENDi is asserted. At the same time, the memory controller 1, upon detection of the assertion of the ready signal RDYi of another device, makes arbitration and can accept the access cycle of the particular device in the next clock cycle. The device of which the last access cycle has been accepted is not arbitrated. Nevertheless, such a device can immediately issue the next access request by asserting the ready signal RDYi.

The memory controller 1, when it selects the access from one device, basically accepts only the access of the same device until the assertion of the last cycle discrimination signal ENDi. The period from the selection of the access of a given device by the memory controller 1 to the acceptance of the last access cycle (the assertion of the acknowledge signal ACKi) for which the last cycle discrimination signal ENDi has been asserted is called a transaction. The addresses of a plurality of the access cycles executed during one transaction are arbitrary, and addresses can be accessed over a plurality of pages during one transaction period. Each device can negate the ready signal RDYi and thereby temporarily stops the memory access during the period of one transaction. Also, both a read access and a write access can be requested together during the period of one transaction. Since the efficiency of memory access is adversely affected, however, such access requests are desirably issued after provisional termination of the ongoing transaction by asserting the last cycle discrimination signal ENDi.

Figure 5:
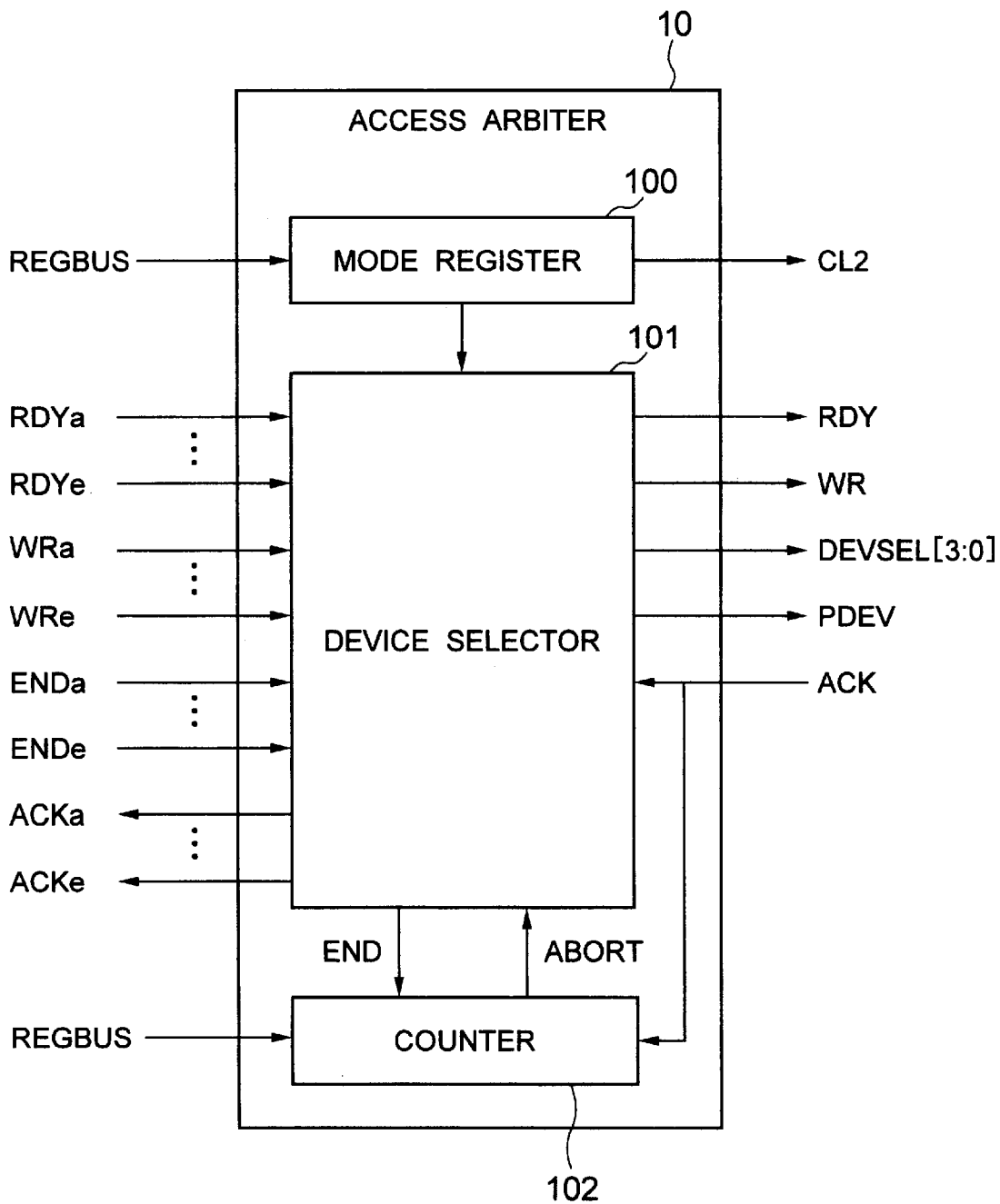
FIG. 5 is a diagram showing a block configuration of an access arbiter.

The access arbiter 10 will be specifically described with reference to FIGS. 5 to 10. The access arbiter 10, as shown in FIG. 5, includes a mode register 100, a device selector 101 and a counter 102, and a register bus REGBUS is connected to each device.

The mode register 100 sets the order of priority for memory access arbitration, the column latency of the memory 7 (the number of clock cycles from the issue of a read command for the SDRAM to the output of the read data from the SDRAM) and the precharge mode. The data on the column latency and the order of priority are set in the mode register 100 through the register bus REGBUS.

As shown in FIG. 6, the order of priority PRi [2:0] of memory access of each device, the column latency CL2, and the precharge mode PDi indicating whether the advance precharge is executed or not in response to a request from each device are set in the mode register 100. Two or three cycles are set as the column latency, so that the column latency is 3 cycles in the case where CL2 is 0, and the column latency is 2 cycles in the case where CL2 is 1. In the case where PDi is 0, on the other hand, it indicates that the advance precharge is not executed for the particular device, while in the case where PDi is 1, it indicates that the advance precharge is executed in response to the request from the particular device.

As to the order of priority PRi [2:0]="000" to "111", as shown in FIG. 7, the smaller the value of PRi[2:0], the higher the order of priority. In the case where the same order of priority is set for a plurality of devices, the accesses from the devices are arbitrated according to the round robin algorithm. Specifically, in the arbitration according to the round robin algorithm, a device from which the access has been accepted at a time point nearest to the timing of execution of arbitration has the lowest order of priority among the devices initially having the same order of priority. In the case where the order of priority is "000", the privilege mode prevails. In the case where a device set to the privilege mode issues a memory access request, the transactions in execution for the other devices are suspended (not suspended in the case where the transaction in execution is in privilege mode), and the transaction of the device in privilege mode is executed ignoring the ABORT signal from the counter 102 described later.

The device selector 101, upon detection of the assertion of the ready signals RDYi from the devices, asserts the ready signals RDY, selects a device in accordance with the order of priority set in the mode register 100 and holds the signal for discriminating the particular device. At the same time, the device selector 101 outputs the number of the device as DEVSEL[3:0] and the write/read discrimination signal WRi of the selected device as WR. In the case where the advance precharge PDi of the selected device is set to 1 in the mode register 100, the device selector 101 asserts the advance precharge signal PDEV. The assertion of RDY and the output of DEVSEL [3:0], WR and PDi are sustained during the period when RDYi of the selected device is asserted.

Also, the device selector 101, upon detection of the assertion of the acknowledge signal ACK from the memory control unit 11, asserts the acknowledge signal ACKi for the selected device. In the case where the selected device asserts the last cycle discrimination signal ENDi in the same cycle, the device selector 101 determines that the transaction is over, and asserts the END signal for one clock cycle in the counter 102 while at the same time restarting the arbitration of accesses in the next clock cycle.

The counter 102 clears the count upon assertion of the last cycle discrimination signal END signal, and during the assertion of the acknowledge signal ACK, sequentially increments the count in synchronism with the clock cycle. When the count value comes to coincide with a predetermined set value, the counter 102 asserts the ABORT signal. Specifically, the counter 102 is for counting the number of access cycles for a given transaction. In the case where the number of access cycles of the transaction of a given device is extremely long, the memory access from other devices is adversely affected. Therefore, an upper limit is set for the number of access cycles per transaction, in the case where the counter 102 detects that the upper limit of the number of access cycles has been reached, the memory controller 1 provisionally suspends the transaction (which is called the abort), and accepts the memory access of another device. The upper limit of the number of access cycles per transaction can be set to an arbitrary value on the counter 102 through the register bus REGBUS.

The device selector 101, upon detection of the assertion of the ABORT signal of the counter 102, determines that the transaction is suspended, and asserts the END signal for one clock cycle on the counter 102 while at the same time restarting the arbitration of accesses from the next clock cycle. The devices cannot recognize the suspension of the memory access by the abort, and recognize it as a simple delay of the assertion of the acknowledge signal ACKi by the memory controller 1. The devices, therefore, continue the assertion of the ready signal RDYi. In this way, the memory controller 1 selects and continues to execute the suspended transaction based on the order of priority immediately after completion of the next or subsequent transaction.

Figure 8:
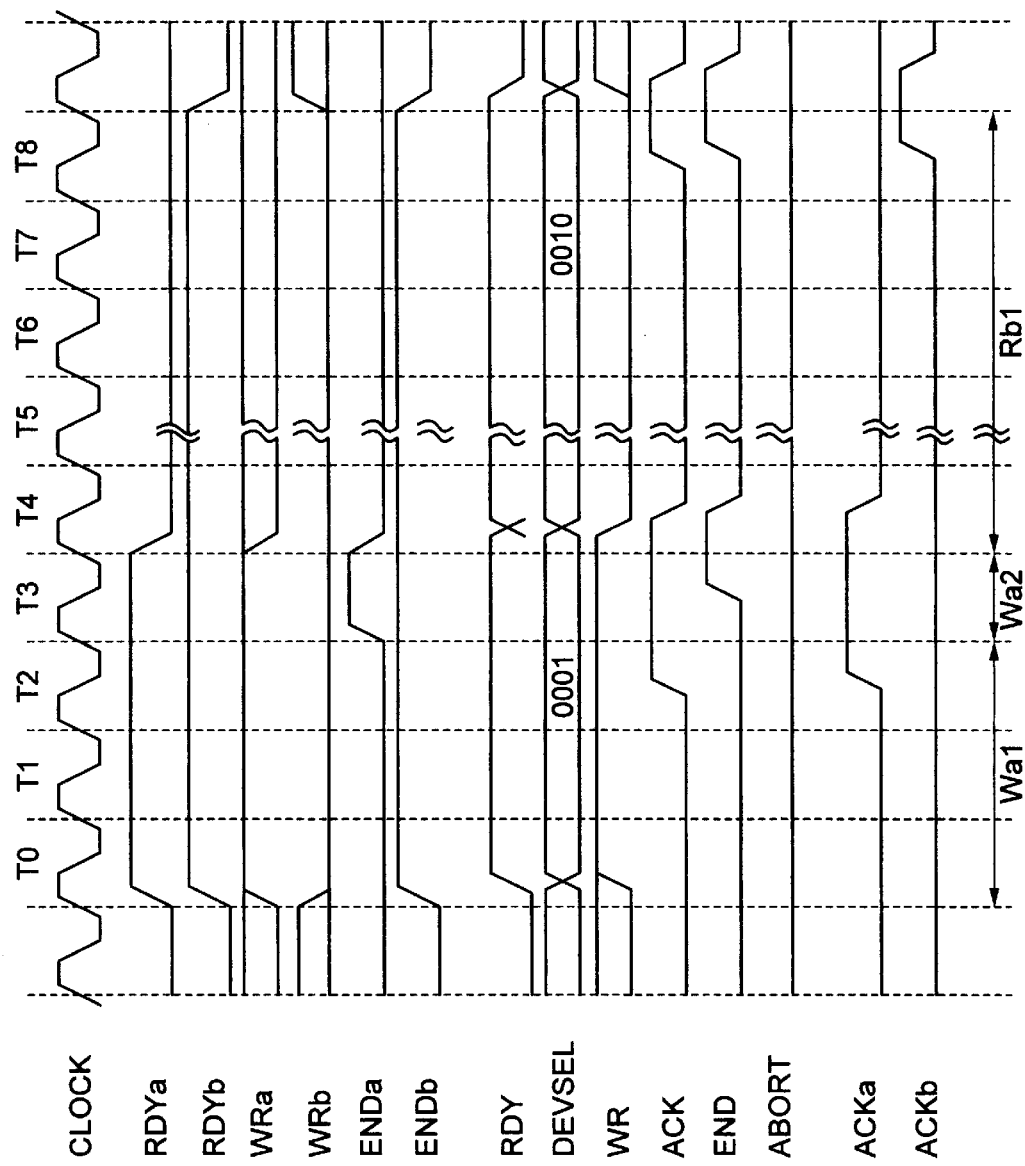
FIG. 8 is a time chart for explaining the operation of the access arbiter.
Figure 9:
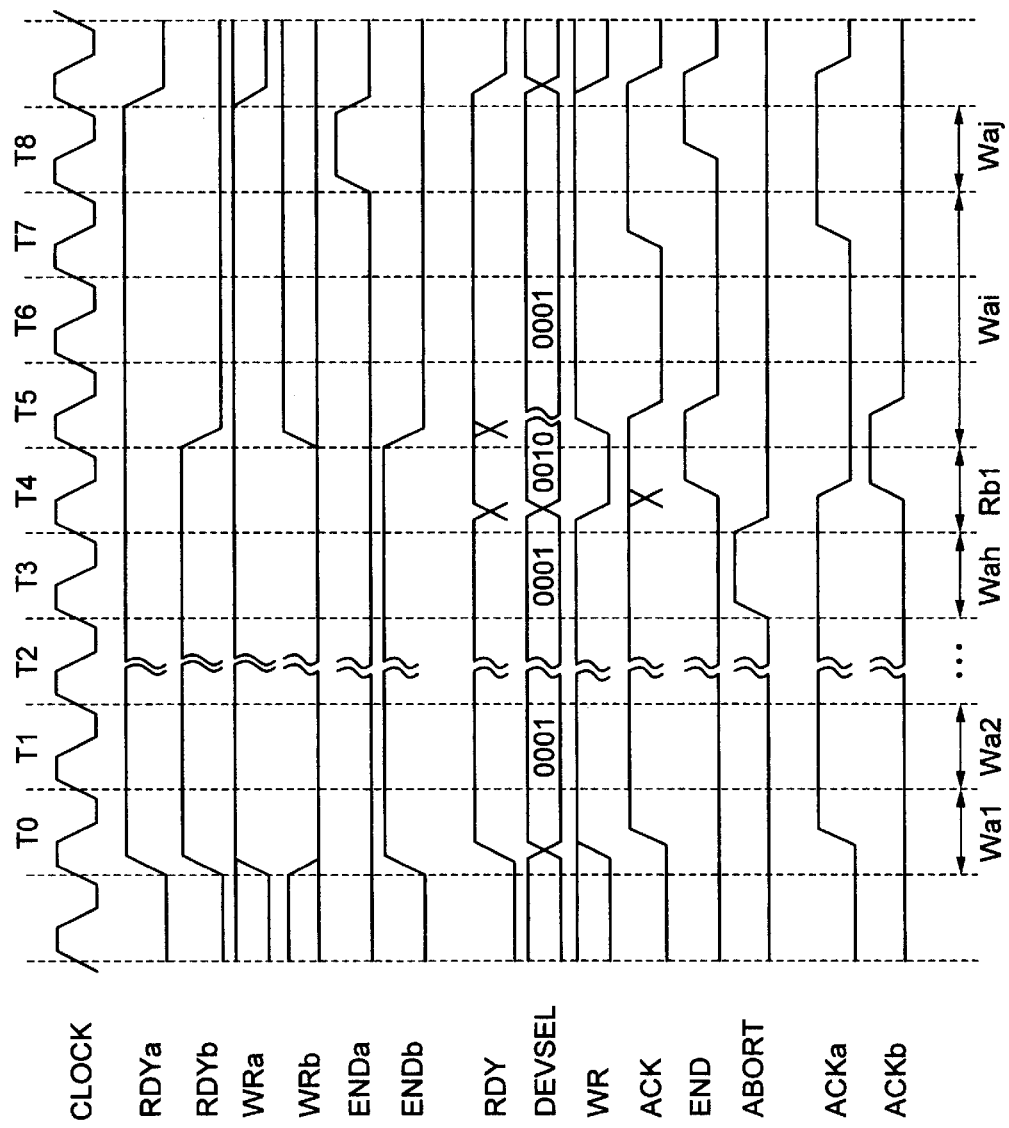
FIG. 9 is a time chart for explaining the operation of the access arbiter.
Figure 10:
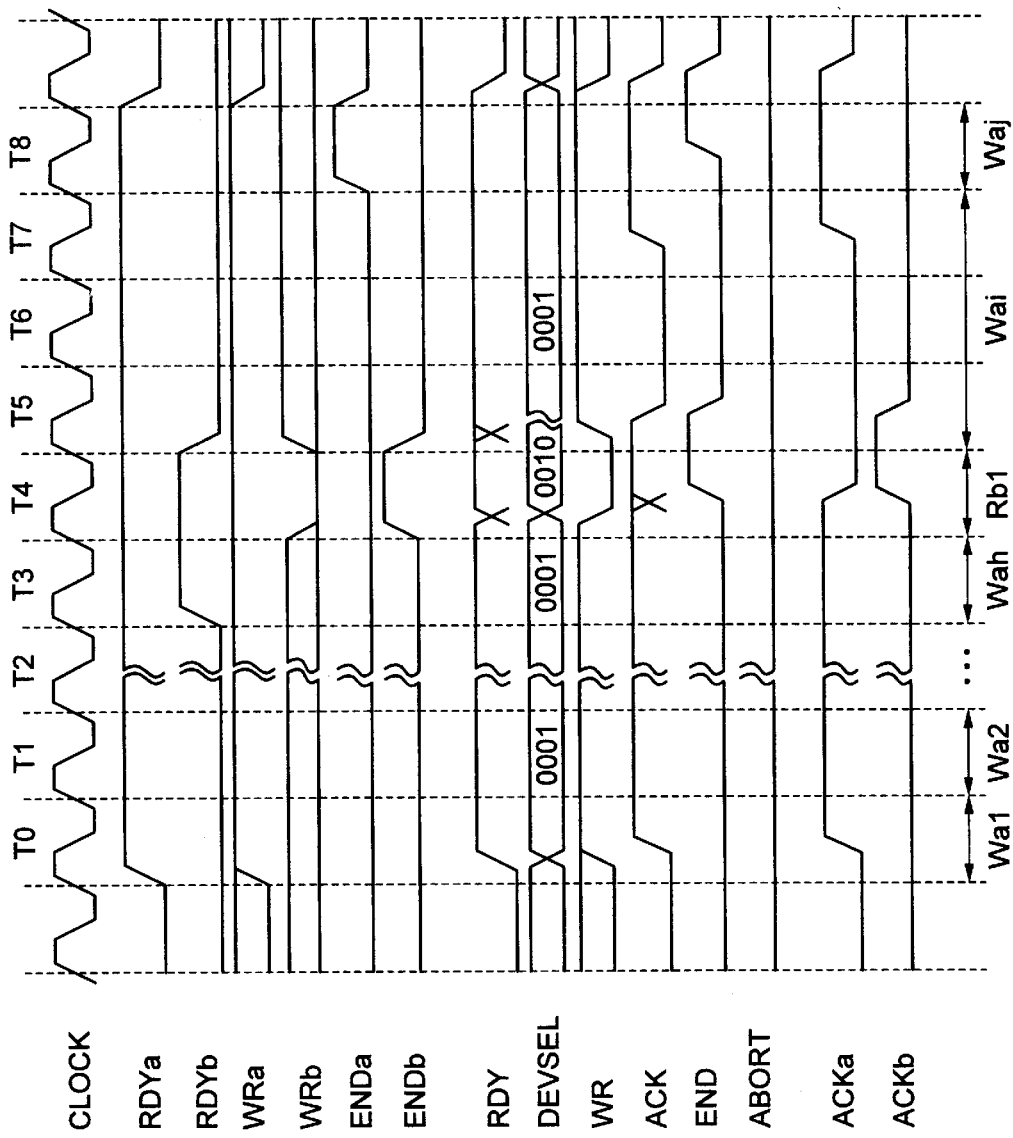
FIG. 10 is a time chart for explaining the operation of the access arbiter.

Now, the operation of the access arbiter 10 will be explained with reference to FIGS. 8 to 10. FIG. 8 shows the case in which the device a is in write access and the number of access cycles is 2, while the device b is in read access and the number of access cycle is 1, the order of priority being higher for the device a than for b. The value of DEVSEL [3:0] is 0001 for the device a and 0010 for the device b.

In FIG. 8, in the case where the device a and the device b assert the ready signal RDYi at the same time at clock cycle T0, the memory control unit 11 selects the device a based on the order of priority. The memory control unit 11 asserts the acknowledge signal ACK for the first access cycle of the device a at the clock cycle T2, and asserts the acknowledge signal ACK for the next access cycle at the clock cycle T3. Further, after the assertion of the last cycle discrimination signal ENDa at the clock cycle T3, the device b is selected from the clock cycle T4 and the read access is executed. At the clock cycle T8, the acknowledge signal ACK is asserted for the first and last access cycle for the device b.

On the other hand, assume that the transaction for the device a is suspended by the abort signal. As shown in FIG. 9, the transaction for the device a is started at clock cycle T0, and suspended by the assertion of the ABORT signal at clock cycle T3. The transaction for the device b is executed at the next clock cycle T4. Since the number of access cycle of the transaction for the device b is 1, the transaction for the device b is terminated at clock cycle T4, and the transaction for the device a is restarted from the next clock cycle T5.

Suppose that a memory access requests comes from the device b in privilege mode while the transaction for the device a is under execution. As shown in FIG. 10, the transaction for the device a, which is started at clock cycle T0, is suspended at clock cycle T3 when the ready signal RDYi is asserted by the device b in privilege mode, and the transaction for the device b is executed at the next clock cycle T4. The transaction for the device b, of which the number of access cycle is 1, is terminated at clock cycle T4 and the transaction for the device a is restarted from the next clock cycle T5.

Figure 11:
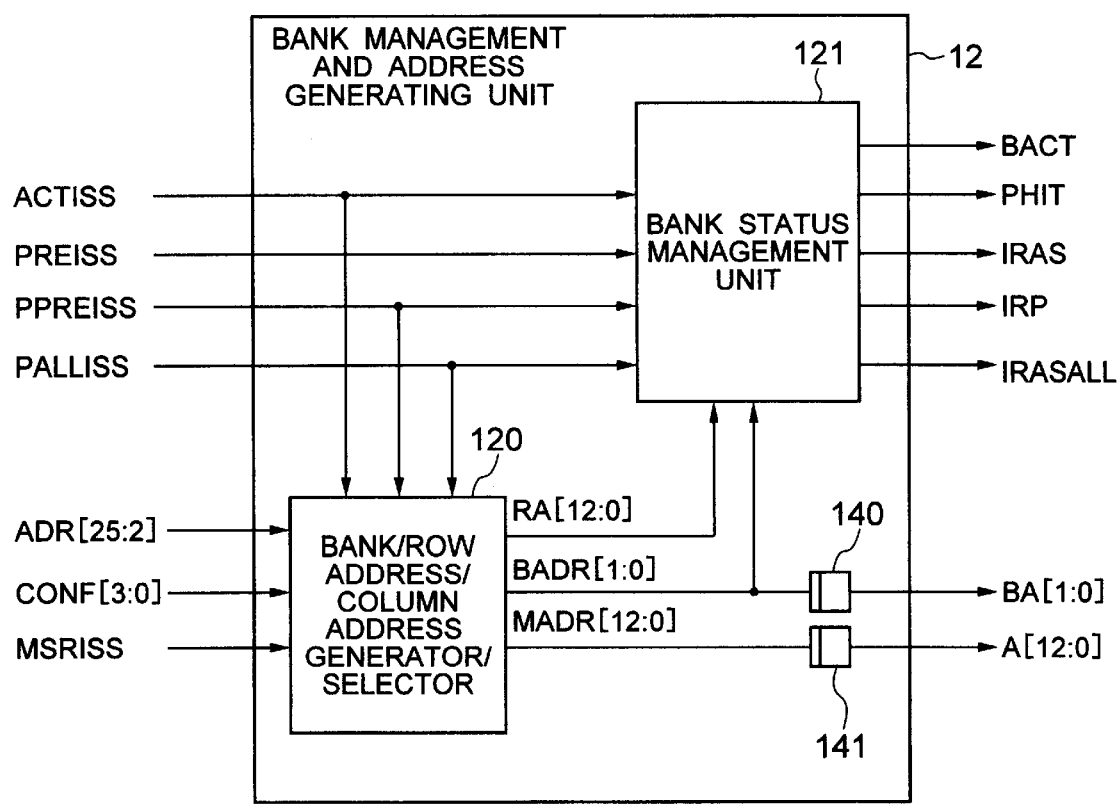
FIG. 11 is a diagram showing a block configuration of an bank management and address generator.

A configuration of the bank management and address generating unit 12 is shown in FIG. 11. The bank management and address generating unit 12 includes an address generating unit 120, a bank status management unit 121, a bank address latch 140 and a row/column address latch 141. The address generating unit 120 and the bank status management unit 121 are supplied with various commands generated by the memory control unit 11, and the address generating unit 120 is supplied with an access address ADR [25:2] and a mode signal CONF [3:0].

An active command ATCISS is applied to the memory 7 from the memory control unit 11 as a signal indicating that an active command has been issued, and a precharge command PREISS is applied to the memory 7 from the memory control unit 11 as a signal indicating that a precharge command has been issued. Also, an advance precharge command PPREISS is applied from the memory control unit 11 to the memory 7 as a signal indicating that an advance precharge command has been issued in advance precharge mode. An all-bank precharge command PALLISS, on the other hand, is applied to the memory 7 from the memory control unit 11 as a signal indicating that a precharge command for executing the precharge of all the banks has been issued, and a mode register set command MRSISS is applied as a signal indicating that a mode register set command has been issued.

The address generating unit 120 generates and outputs a bank address BADR [1:0], a row address RA [12:0], a row address or a column address MADR [12:0] based on the access address ADR [25:2] indicating the address of a device selected by the MUX 14, the mode signal CONF [3:0] indicating the configuration (memory capacity) of the memory 7 and various commands. Whether MADR [12:0] is a row address or a column address is determined by the type of the command issued. The signal BA[1:0] (="00" to "11") for selecting one of the four banks represents the bank address BADR [1:0] latched by a latch 140, and the row/column address A [12:0] represents the address MADR [12:0] latched by a latch 141. Specifically, the address generating unit 120 outputs, as an element of the memory control means, the bank address BA [1:0] and the row/column address A [12:0] for selecting a bank to be accessed among the banks of the memory 7, a page and specific data in the page.

The bank status management unit 121 holds the status of each bank of the memory 7 based on the various commands issued from the memory control unit 11, and supplies the memory control unit 11 with the information for optimizing the access to the memory 7. Specifically, the bank status management unit 121 holds the following bank status information by bank:

(1) Whether in active or inactive state
(2) Column address in active state
(3) Whether the minimum number of cycles between activation and precharge has passed
(4) Whether the minimum number of cycles between precharge and activation has passed.

Based on these information, the bank status management unit 121 supplies the memory control unit 11 with the following information for each access cycle:

(1) BACT: indicating that the bank to be accessed is active.

(2) PHIT: indicating that the page to be accessed is active (page hit).

(3) IRAS: indicating that the minimum number of cycles has passed in the process from activation to precharge in the bank to be accessed.

(4) IRP: indicating that the minimum number of cycles has passed in the process from precharge to activation in the bank to be accessed.

(5) IRASALL: indicating that the minimum number of cycles has passed in the process from activation to precharge in a bank.

These information are supplied to the memory control unit 11 as a high-level signal, for example.

The address generating unit 120 generates various addresses in accordance with the configuration (memory capacity) of the memory 7 as shown in FIG. 12. The mode signal CONF [3:0] shows a configuration of the memory 7. In the case where CONF [3:0] is "0", the memory 7 has four banks (banks 0 to 3) each 4096 pages, while each having 2567 words per page. In the case where the CONF [3:0] is "1", on the other hand, the memory 7 is configured of four banks each having 4096 pages which in turn each contains 512 words. Further, in the case where CONF[3:0] is "2", the memory 7 is configured of four banks each having 8119 pages which in turn contains 512 words. One word is 32 bits (4 bytes) and the same as the width of the memory data bus DQ [31:0].

In the case where CONF [3:0] is "0", an address is generated according to whether a command is issued or not. When issuing an active command (ACTISS =1), for example, the ADR [11:10] is selected from the access addresses [25:2] as a bank address BADR [1:0] and the ADR [23:12] is selected as a row address A [11:0]. In this case, the most significant bit RA [12:0] becomes 0. Further, as to the row or column address MADR [12:0], the row address ADR [23:12] is selected, of which the most significant bit is 0. In the case where the advance precharge command is issued (PPREISS=1), on the other hand, ADR [11:0]+1 is selected as the bank address BADR [1:0]. Specifically, an address of a bank adjacent to the bank designated by the active command is output. In the case where the all-precharge command is issued (PALLISS=1), on the other hand, the same bank address as at the time of issue of an active command is generated, while at the time of issuing PPREISS or PALLISS, on the other hand, the column address ADR [9:2] is generated for selecting specific data (bytes) in the page as the MADR [12:0].

Figure 13:
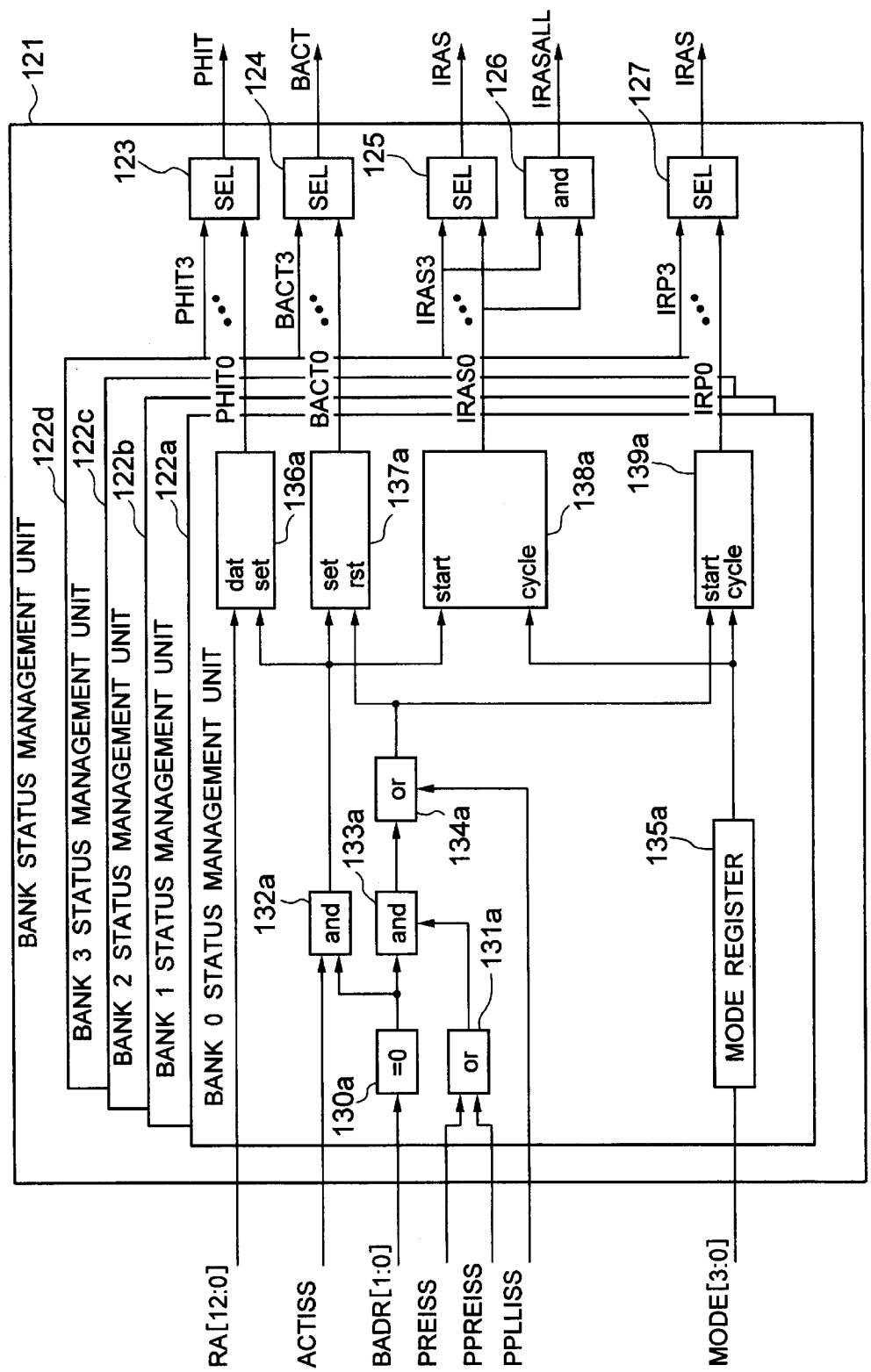
FIG. 13 is a block diagram showing a bank status management unit.

FIG. 13 shows a configuration of the bank status management unit 121. The bank status management unit 121 includes bank n status management sections 122a, 122b, 122c, 122d for holding the status of the four banks 0 to 3, respectively. Each bank n status management section has the same configuration, and therefore the bank 0 status management section 122a will be explained. The bank 0 status management section 122a includes a coincidence detection circuit 130a for determining whether the bank to be accessed is bank 0 or not, OR circuits 131a, 134a, AND circuits 132a, 133a, a mode register 135a, a row address buffer 136a for holding a row address of a page activated in the bank 0, an active flag 137a for indicating that any one of the pages of the bank 0 is activated, a RAS counter 138a for counting the minimum number of cycles in the process from activation to precharge, and a RP counter 139a for counting the minimum number of cycles in the process from precharge to activation. The row address buffer 136a is connected to a selector 123, the active flag 137a is connected to a selector 124, the RAS counter 138a is connected to a selector 125 and an AND circuit 126, and the RP counter 139a is connected to a selector 127. The selectors 123, 124, 125, 127 are adapted to select and output only the signal from the bank status management unit designated by the bank address.

The mode register 135a is for setting the minimum number of cycles in the process from activation to precharge and the minimum number of cycles in the process from precharge to activation. The setting is obtained as an arbitrary value through the register bus REGBUS.

The coincidence detection circuit 130a outputs a high-level signal "1" when the bank 0 is designated by the bank address. The AND circuit 132a outputs a high-level signal "1" to the row address buffer 136a, the active flag 137a and the RAS counter 138a when ACTISS assumes "1" with the issue of the active command. The AND circuit 133a, on the other hand, outputs a high-level signal "1" to the OR circuit 134a when the bank 0 is designated by the bank address and any one of the commands assumes "1" with the issue of PREISS or PPREISS. The OR circuit 134a outputs a reset signal of high level "1" to the active flag 137a and a start signal of high level "1" to the RP counter 139a when a high-level signal "1" is output from the AND circuit 133a or PALISS assumes "1", i.e. on condition that the precharge has been performed.

The row address buffer 136a holds the row address RA[12:0] when the active command is issued (when ACTISS is asserted) in the access cycle to the bank 0. In each subsequent access cycle when the same bank is to be accessed, the row address buffer 136a compares the row address held therein with the row address of the same bank to be accessed, and in the case where they coincide with each other, asserts the page hit PHITO and outputs a high-level signal "1" to the selector 123. Specifically, the row address buffer 136a has the function of determining a page hit. Further, the row address buffer 136a, together with the selector 123, is configured as page hit determining means for determining whether the page to be accessed is active or not.

When an active command is issued (when ACTISS is asserted) in the access cycle to the bank 0, the active flag 137a is set to "1" thereby to assert the bank active signal BACTO while at the same time outputting a high-level signal "1" to the selector 124. When a precharge command for the bank 0 is issued (when any one of the commands PREISS, PPREISS and PALLISS is asserted), on the other hand, the active flag 137a is cleared to "0" thereby to negate the signal PACTO (outputs a low-level signal "0"). Specifically, the active flag 137a, together with the selector 124, makes up bank activation determining means for determining whether the bank to be accessed is activated or not.

The RAS counter 138a, which normally asserts IRAS0, starts counting and negates the IRAS0 when an active command is issued (when ACTISS is asserted) in access cycle to the bank 0, and after passing the minimum number of cycles in the process from activation to precharge set in the mode register 135a, asserts IRAS0 again and outputs a high-level signal "1" to the selector 125 and the AND circuit 126. Specifically, the RAS counter 138a, together with the selector 125, makes up means for determining the minimum number of cycles in the process from activation to precharge.

The RP counter 139a, which normally asserts IRP, starts counting while at the same negating the IRPO and outputs a low-level signal "0" to the selector 127 when a precharge command for the bank 0 is issued (when any one of the commands PREISS, PPREISS and PALLISS is asserted), and after the passage of the minimum number of cycles in the process from precharge to activation set in the mode register 135a, asserts the IRPO again and outputs a high-level signal "1" to the selector 127. Specifically, the IRP counter 139a, together with the selector 127, makes up means for determining the minimum number of cycles in the process from precharge to activation.

Figure 14:
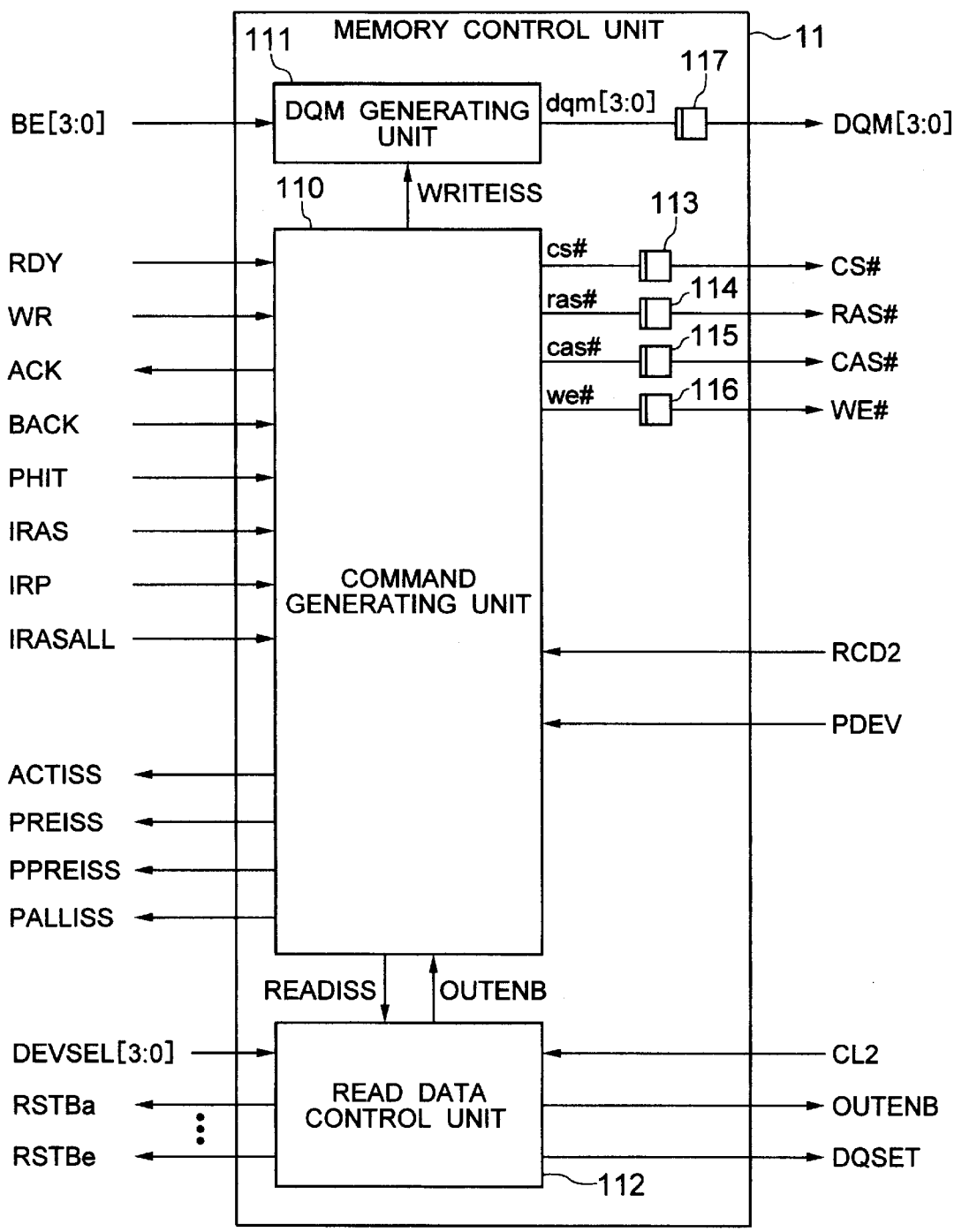
FIG. 14 is a block diagram showing a memory control unit.

In the bank status management unit 121 having the configuration mentioned above, assume that the bank activation determining means determines that the bank to be accessed is not activated (in the case where the active flag 137a is "0"). The page to be accessed is activated on condition that the affirmative result is output from the precharge-to-activation minimum cycle number determining means (when the output of the RP counter 139a is "1"), and after this activation, information is generated for instructing the memory 7 to execute the access by the write or read operation. On the other hand, assumes that the bank activation determining means determines that the bank to be accessed is activated (when the output of the active flag 137a is "1"). Immediately after the page hit determining means produces an affirmative result (when the output of the row address buffer 136a is "1"), the information is generated for giving an instruction to make access by the write or read operation. Further, in the case where the bank activation determining means determines that the bank to be accessed is activated and the page hit determining means produces a negative result (when the output of the row address buffer 136a is "0"), the bank to be accessed is precharged on condition that the activation-to-precharge minimum cycle number determining means produces an affirmative result (when the output of the RAS counter 139a is "1"). Then, after activating the page next to be accessed, the information is generated for giving an instruction to execute the access by the write or read operation. These information are output to the memory control unit Now, the memory control unit 11 will be specifically described with reference to FIGS. 14 to 19. The memory control unit 11, as shown in FIG. 14, includes a command generating unit 110, a DQM generating unit 111, a read data control-unit 112, and latches 113, 114, 115, 116.

The command generating unit 110, upon receipt of signals for CL2, RDY, WR, DEVSEL[3:0] from the access arbiter 10, generates various commands for accessing the memory 7 based on these signals, and outputs the various commands to the bank management and address generating unit 12. At the same time, the command generating unit 110 outputs control signals (RAS#, CAS#, WE#, CS#) corresponding to the commands to the memory 7 thereby to control the access to the memory 7.

Figure 15:
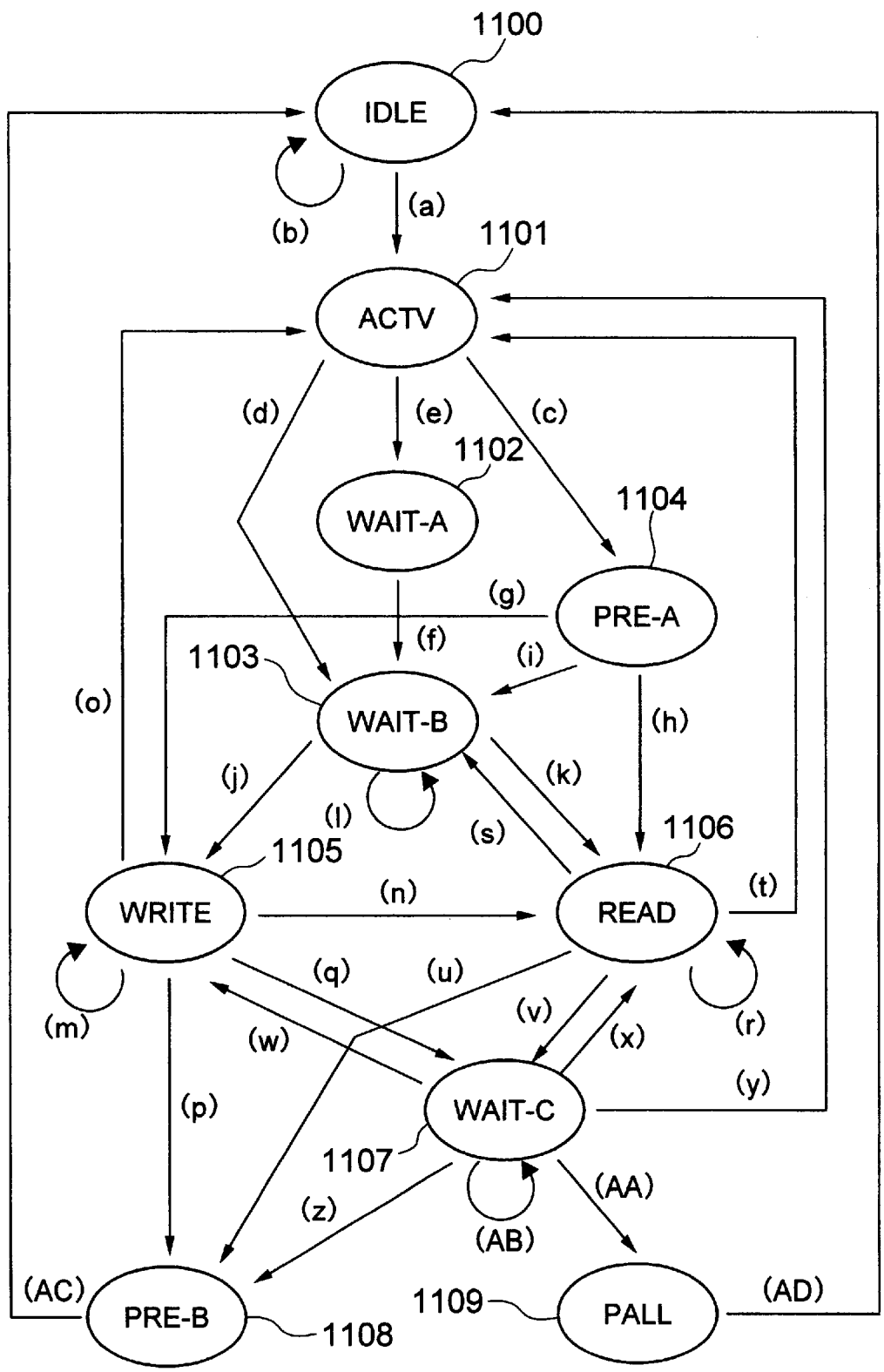
FIG. 15 shows a state transition for controlling the command issue in the command generator.

FIG. 15 shows the status transition for controlling the command issue in the command generating unit 110, FIG. 16 the conditions for each status transition in FIG. 15, and FIG. 17 the status of the output signal due to the status transition (the state of the control signal corresponding to each command) in FIG. 15.

Reference is made to FIG. 15. In IDLE state 1100, no access request is given from the devices and an access request waiting cycle prevails. Once the transition condition is met that the RDY signal is output in the absence of the IRP output (#a in FIG. 16), the process is executed for activation as a transition destination. The ACTV status 1101 is a cycle for issuing the bank activation command (ACTV). On condition that the advance precharge is asserted (#c of FIG. 16), the status is transferred to PRE-A. In the case where the advance precharge is negated and two or three cycles are designated as RCD2 (#d of FIG. 16), on the other hand, the status transfers to WAIT-B. Otherwise (#6 of FIG. 16), the status transfers to WAIT-A. The WAIT-A status 1102 is the wait cycle (one-cycle wait cycle) between ACTV and WRITE or between ACTV and READ for the column latency of 3 cycles, while the WAIT-B status 1103 is a wait cycle (one-cycle wait cycle) before issue of a write command or a read command. The PRE-A status 1104 is a cycle for issuing, in the transaction of the advance precharge mode upon assertion of the advance precharge PDEV, a precharge command (PRE) for the adjacent bank n+1 immediately after issuing the active command ACTV to the bank n. The WRITE status 1105 is a cycle for issuing a write command (WRITE), the READ status 1106 is a cycle for issuing a read command (READ), the WAIT-C status 1107 is a wait cycle (one cycle) before issuing the precharge command or the all-bank precharge command, the PRE-B status 1108 is a cycle for issuing a precharge command (PRE), and the PALL status 1109 is a cycle for issuing the all-bank precharge command (PALL). Specifically, in each status, a command is issued for transfer to a transition destination when the transition conditions are met. The term "otherwise" indicates a common practice, and indicates that in the case where the source and destination are the same, the same processing is repeated.

Upon generation of various commands in the memory control unit 11, whether a command has been issued or not is indicated by "1" and "0". In the case where no command is issued, the output value is at low level of "0", while when the command is issued, the output value assumes a high level of "1". The commands ACTISS, PREISS, PPREISS, PALLISS, WRITE and READ are asserted in the case where the next clock cycle assumes the ACTV status, the PRE-B status, the PRE-A status, the PALL status, the WRITE status and the READ status, respectively. Upon issue of various commands, a control signal corresponding to a given command signal is output to the memory 7 as a negative logic signal.

In the case where the active command ACTV is issued, for example, the signals CS# of "0", RAS# of "0", CAS# of "1" and WE# of "1" are output to the memory 7 as a control signal. Also, when an advance precharge command (PRE-A) is issued, the control signals including CS# of "0", RAS# of "0", CAS# of "1" and WE# of "0" are output to the memory 7 as a negative logic signal. These control signals correspond to the commands, respectively, so that the memory 7 can be controlled based on the commands.

The DQM generating unit 111 is supplied with a byte enable signal BE[3:0] for designating the bytes to be written. Based on the byte enable signal BE, as shown in FIG. 18, the DQM generating unit 111 outputs a signal "0" only for the bytes to be written when WRITEISS is issued from the command generating unit 110, and a mask signal dqm[3:0] of "1" for the bytes of which the write operation is inhibited. Specifically, when WRITEISS is asserted and the WRITE command is issued in the next cycle, the polarity inverted signal of the byte enable signal BE [3:0] is output as dqm [3:0]. Otherwise, the signal is negated to low level. The signal dqm [3:0] is latched by the latch 117 and output to the memory 7 as DQM [3:0].

Figure 19:
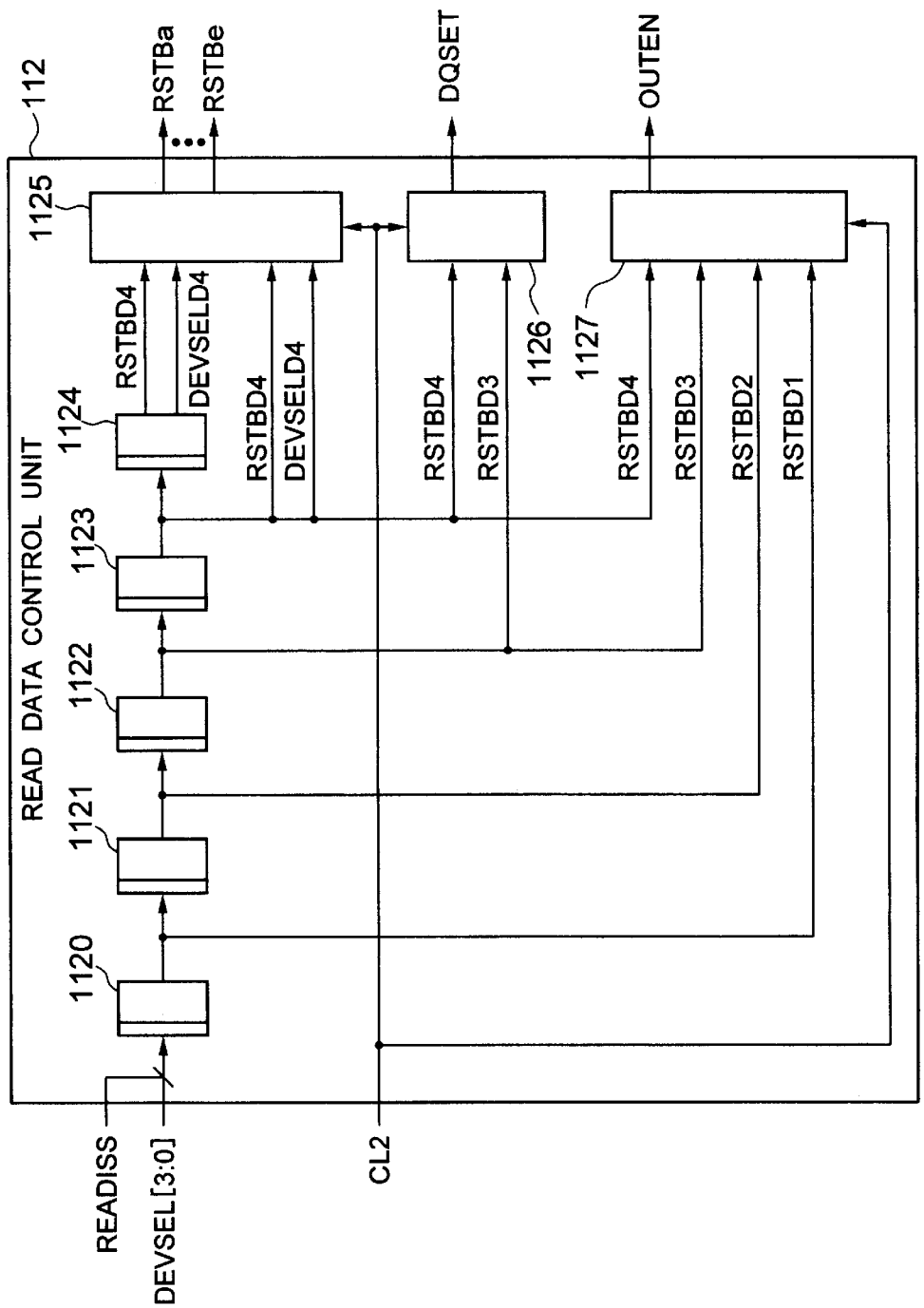
FIG. 19 is a block diagram showing a read data control unit.

The read data control unit 112, as shown in FIG. 19, includes latches 1120, 1121, 1222, 1123, 1124, a read data strobe signal (RSTBi) generating circuit (RSTBGEN) 1125, a read data set signal (DQSET) generating circuit (DQSETGEN) 1126, a DQ output enable signal (OUTENB) generating circuit (OUTENBGEN) 1127.

The latches 1120, 1121, 1122, 1123, 1124 are adapted to latch the READISS and the DEVSEL [3:0] sequentially in synchronism with the clock cycle. This is accomplished in such a manner that RSTBi, DQSET and OUTENB are generated at the timing of output of the read data by the memory 7 with a column latency from the issue of the read command.

The read data strobe signal generating circuit 1125 retrieves the read data received from the memory 7 and outputs it to the devices as RDT [31:0]. At the same time, the circuit 1125 asserts RSTBi for the device indicated by DEVD5 [3:0] in the case where CL2 is 0 (column latency is three cycles) and RSTBD5 is asserted on the one hand, and asserts RSTBi for the device indicated by DEVD4 [3:0] in the case where CL2 is 1 (column latency is two cycles) and RSTBD4 is asserted on the other hand.

Specifically, the read data strobe signal generating circuit 1125 is configured to generate the read data strobe signal RSTBi in accordance with the equations below.

RSTBa=CL2& RSTBD4& (DEVD4=DEVa)|CL2& RSTBD4& (DEVD5=DEVa)

RSTBb=CL2& RSTBD4& (DEVD4=DEVb)|CL2& RSTBD4& (DEVD5=DEVb)

RSTBe=CL2& RSTBD4& (DEVD4=DEVe)|CL2& RSTBD4& (DEVD5=DEVe)

where "&" designates a logic product, and "|" a logic sum.

The read data set signal generating circuit 1126 holds the latch of the data control unit 15 by asserting DQSET as soon as the memory 7 outputs the read data. For this purpose, the read data set signal generating circuit 1126 asserts DQSET upon assertion of RSTBD4 in the case where CL2 is 0 (the column latency is three cycles) and asserts DQSET upon assertion of RSTBD3 in the case where CL2 is 1 (the column-latency is two cycles).

Specifically, the read data set signal generating circuit 1126 is configured to generate a read data set signal in accordance with the equation below.

DQSET=CL2 & RSTD3|($\overline{\text{CL2}}$ & RSTBD4)

where "$\overline{\phantom{-}}$" indicates inversion.

The DQ output enable signal generating circuit 1127 suppresses the output of DQ [31:0] by the memory controller 1 not only in the clock cycle for the memory 7 to output the read data but also during the period from one clock cycle before the memory 7 outputs the read data to one clock cycle after the memory 7 outputs the read data. For this purpose, the enable signal OUTENB (one clock cycle earlier than the DQ [31:0] output since latched temporarily by the data control unit 15) of the DQ [31:0] output drive of the data control unit 15 is negated from one clock cycle before the memory 7 outputs the read data to one clock after the memory 7 outputs the read data, and asserted otherwise. Specifically, OUTENB is asserted upon assertion of RSTBD3 or RSTBD4 in the case where CL2 is 0 (the column latency is 3 cycles), while OUTENB is asserted upon assertion of RSTBD1, RSTBD2 or RSTBD3 in the case where CL2 is 1 (the column latency is 3 cycles).

Figure 20:
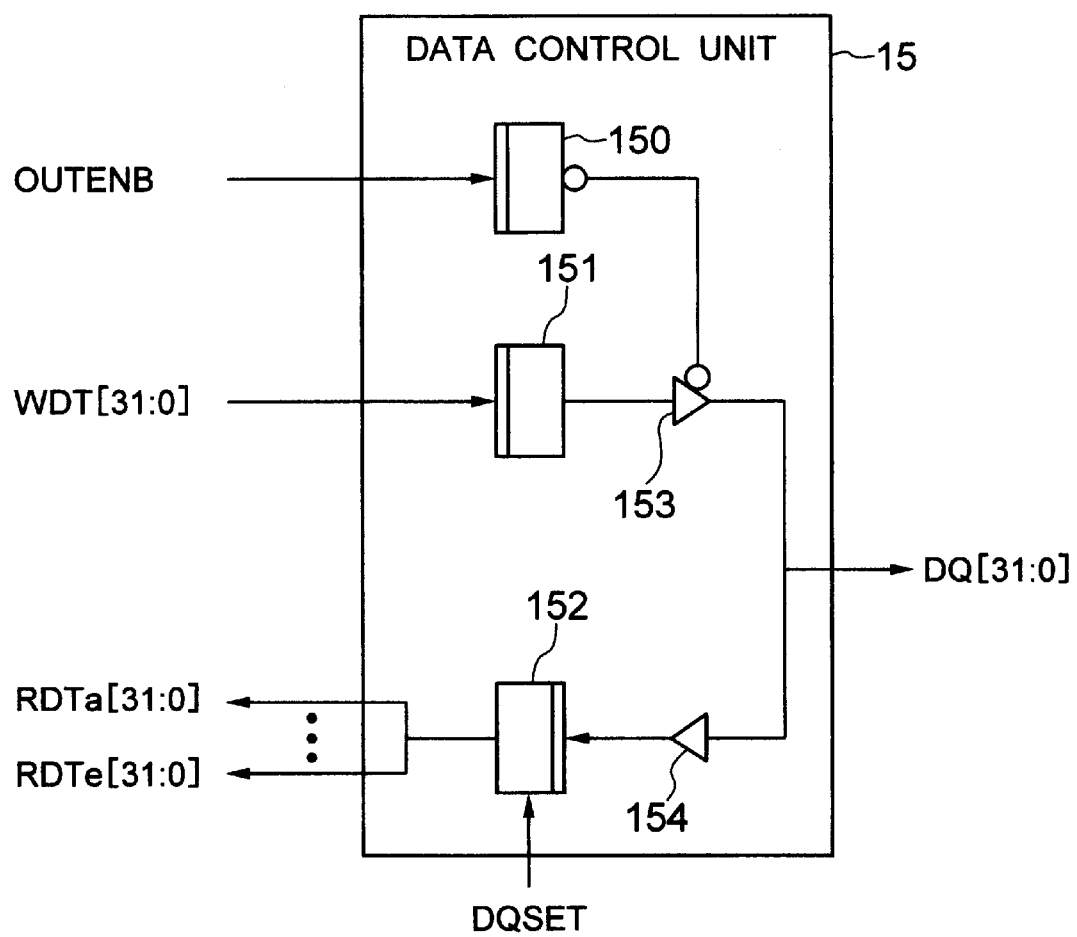
FIG. 20 is a block diagram showing a data control unit.

Specifically, the DQ output enable signal generating circuit 1127 is configured to generate the DQ output enable signal in accordance with the following equations:

$OUTENB = \overline{\phantom{-}}(CL2 \& (RSTBD1|RSTBD2|RSTBD3))$ $|\overline{\phantom{-}}(CL2 \& (RSTBD2|RSTBD3|RSTBD4))$ On the other hand, the data control unit 15, as shown in FIG. 20, includes a latch 150 for latching the data output enable signal OUTENB, a latch 151 for latching the write data WDT [31:0], a latch 152 for holding, during assertion of the DQ set signal, the read data DQ [31:0] output by the memory 7, an output buffer 153 to DQ [31:0] and an input buffer 154 from DQ [31:0].

The latch 150 latches the data output enable signal OUTENB and outputs an inverted polarity signal OUTENB#. The output buffer 153 outputs the write data WDT [31:0] latched in the latch 151 to DQ [31:0] when OUTENB# is at low level. The latch 152, on the other hand, holds the read data DQ [31:0] output from the memory 7 when DQSET is asserted and outputs it to all the devices as RDTi [31:0]. Since the read data strobe signal RSTBI is asserted only for one device, only one device retrieves the read data.

Now, the memory access operation by the memory controller 1 will be explained with reference to FIGS. 21 and 22. The processing free of advance precharge will be explained with reference to FIG. 21, and the processing with advance precharge with reference to FIG. 22. The signal RCD2 is assumed to be "1"(RAS-CAS latency: 2 cycles), and CL2 to be "0" (column latency:3 cycles).

In FIG. 21, in the absence of advance precharge, PDa is set to low level. The memory controller 1, upon detection of the assertion of the ready signal RDYa from the device a at clock cycle T0, issues an ACTV command at clock cycle T1, asserts the acknowledge signal ACKa for the first access cycle a0 at clock cycle T2, and issues a READ command at clock cycle T3. At the same time, the bank address b0 for designating the bank 0 and the row address ra0 for designating a specific page in bank 0 are generated, and the processing is executed for activating the page designated for access by the row address ra0 of the bank 0. Further, with the issue of the READ command, the column address ca0 is output for reading the designated data (bytes) of the activated page, and the access for reading the designated data is carried out at clock cycle T3.

After that, in the case where the read access for the same page is continued, the acknowledge signal ACKa for the second access cycle al is asserted at clock cycle T3, and the READ command is issued at clock cycle T4. Also, the acknowledge signal ACKa for the third access cycle a2 is asserted at clock cycle T4, and the READ command is issued at clock cycle T5. As a result, the data designated by the column addresses ca0, ca1, ca2 are sequentially read as read data rda0, rda1, rda2, respectively.

Upon occurrence of a page mishit (in the case where a page different from the page designated at row address ra0 is accessed) at the fourth access cycle a3 while the read access for the same page is continued, the acknowledge signal ACKa is temporarily negated at and after clock cycle T5, the PRE command is issued from the memory control unit 11 at clock cycle T6, and the bank address b1 for selecting bank 1 is output. After one clock cycle, the ACTV command is issued to set the bank 1 as an object to be accessed at clock cycle T8, and a row address ra1 for selecting the designated page of bank 1 is output. As a result, the page designated by the row address ra1 is activated. After assertion of the acknowledge signal ACKa at clock cycle T9, the READ command is issued at clock cycle T10. As a result, the column addresses ca3, ca4 are output sequentially for selecting the designated data of the page associated with the bank 1 and designated by the row address ra1. Thus, the read data rda3, rda4 are sequentially read at clock cycles T12, T13, and in accordance with the read data strobe signal RSTBa, the read data rda3, rda4 are sequentially transferred to the devices.

The read data rda0 for the first access cycle a0 is output from the memory 7 at clock cycle T5, and upon assertion of the read data strobe signal RSTBa by the memory controller 1 at clock cycle T6, the read data RDTa [31:0] is output to the device a.

In a similar fashion, the read data RDTa [31:0] for the second, third, fourth and fifth access cycles a1, a2, a3 and a4 are output to the devices upon assertion of the read data strobe signal RSTBa at clock cycles T7, T8, T13 and T14, respectively. In this case, the read transaction is 4 clock cycles (T6 to T9) delayed by a page mishit.

Assume, on the other hand, that the device a requires the advance precharge such as a graphic processing unit and outputs an access request. In view of the fact that the signal PDa indicating the advance precharge is asserted, a command for activating the page to be accessed is generated. At the same time, a command is generated for executing the advance precharge for the page to be accessed next or subsequently before execution of the read or write access to the activated page.

Specifically, in the case where the device a asserts the ready signal RDYa and the signal PDa at clock cycle T0, the ACTV command is issued at clock cycle T1, and the bank address b0 for selecting bank 0 and the row address ra0 for selecting a specific page of bank 0 are output. Then, at the next clock cycle T2, the command PRE for the advance precharge is issued.

In this case, the advance precharge command, like the normal precharge command, designates a bank adjacent to the activated bank, which adjacent bank has the same address as the bank activated by the ACTV command at clock cycle T1, plus 1. In the case where the bank address of the ACTV command is 1 at clock cycle T1, for example, the bank address of the PRE command at clock cycle T2 is 2, and in the case where the bank address of the ACTV command at clock cycle T1 is 0, the bank address of the PRE command at clock cycle T2 is 1. Similarly, in the case where the bank address of the ACTV command at clock cycle T1 is 3, the bank address of the PRE command at clock cycle T2 is 0.

Assume that the bank designated by the bank address b1 is precharged (since the data of the page that has already been transferred to the sense amplifier is known from the preceding process to belong to which page of which bank, the processing is executed for returning to the original page the data that has already been transferred to the sense amplifier). The READ command is issued at clock cycles T3, T4, T5, and the read access is made to the bytes designated by the column addresses ca0, ca1, ca2 in the page designated by the row address ra0 in the bank designated by the bank address b0.

After that, if a page mishit occurs at the fourth access cycle a3 (in the case where the access over the tile boundary is executed by drawing), the processing is started for the bank designated by the bank address b1 as an object to be accessed. In this case, the precharge of the bank designated by the bank address b1 has already been executed at clock cycle T2 and the data of the page belong to the particular bank has already been returned to the original page. Therefore, the page belonging to this bank is immediately activated by issuing the ACTB command. After that, in order to read the designated data from the page which belongs to the bank designated by the bank address b1 and which is designated by the row address ra1, the column addresses ca3, ca4 are output in accordance with the READ command issued at the fifth access cycle a4, and the read access is executed to the data (bytes) designated by the column addresses ca3 and ca4.

As described above, since a page mishit occurs as an access is made over the page boundary, the advance precharge is executed for the bank next to be accessed prior to the occurrence of a mishit. Even in the case where a page mishit occurs at the fourth access cycle a3, therefore, the ACTV command can be issued at clock cycle T6, the acknowledge signal ACKa can be asserted at clock cycle T7 and the READ command can be issued at clock cycle T8. Thus, the delay of the read transaction due to the page mishit is two clock cycles (T6 to T7). As compared with the case shown in FIG. 21, the execution of the advance precharge can reduce the delay of the read transaction, with the result that the shortened overhead time increases the data amount accessible per unit time and can contribute to an improved band width.

Figure 22:
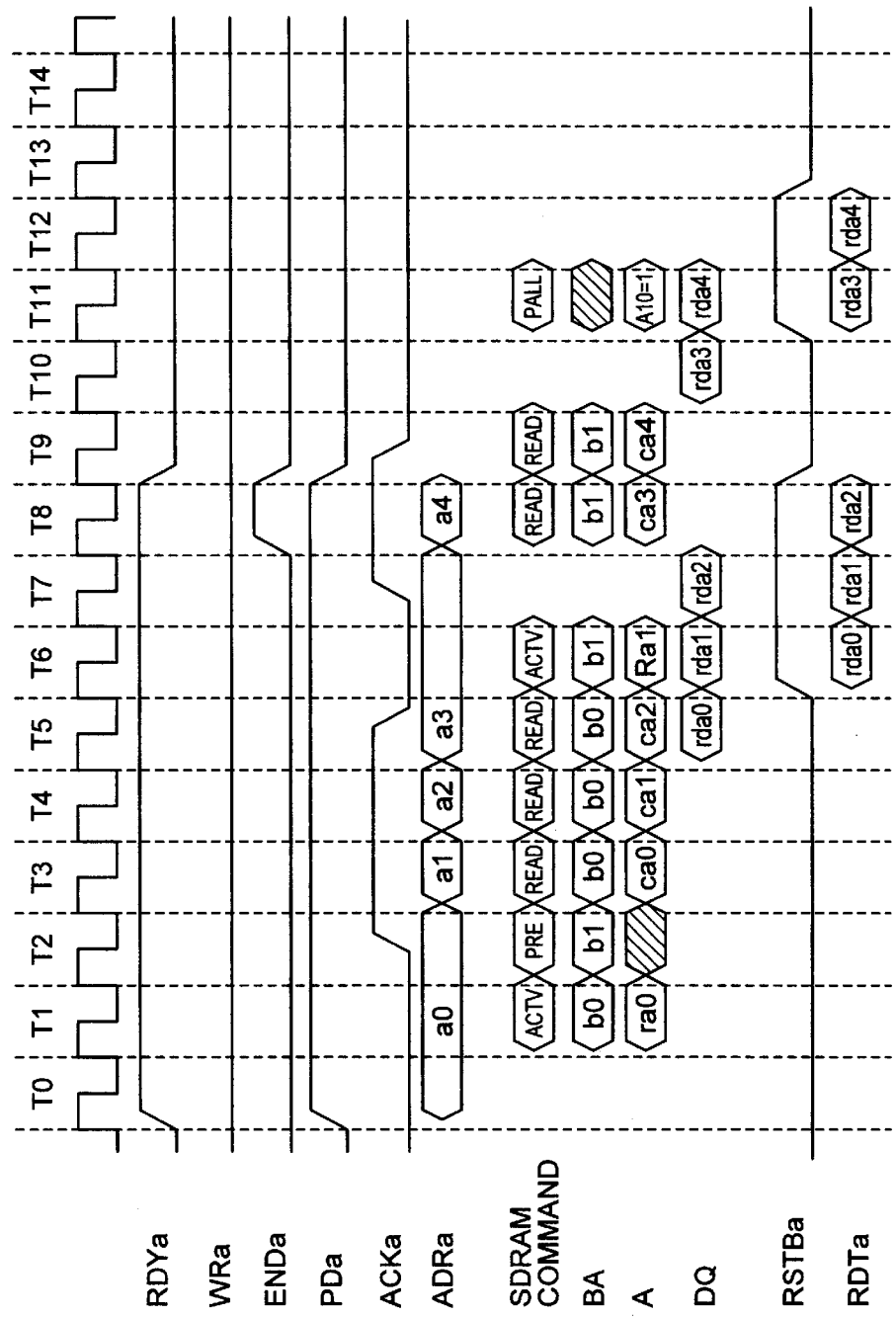
FIG. 22 is a time chart for memory access in the case where the advance precharge is carried out in the memory controller according to this invention.

Although the processing in FIGS. 21 and 22 refers to the read transaction, the delay of the write transaction can also be reduced by executing the advance precharge.

As described above, according to this embodiment, in the tile address mapping of image data in the memory 7, the horizontally adjacent tiles are arranged in different banks at the ascending order of bank address, and in the case where the image data area read or written, the advance precharge is executed for the bank address n+1 immediately after activating a predetermined page of the bank address n to be accessed. Even in the case a page mishit occurs over the tile boundary while reading or writing the image data, therefore, the overhead of the memory access due to a page mishit can be reduced in view of the fact that the bank having arranged therein the tiles next to be accessed is already precharged.

Also, according to this embodiment, the memory controller 1, when selecting a memory access from the devices, selects one device in accordance with the order of priority. In the case where an access is requested from a device of higher priority while the access to the selected device is under execution, the particular access in execution is suspended, and the memory access from the device of higher priority is executed. Even in the case where the access requests from a plurality of devices contend each other, therefore, an access request is selected from a device in the descending order of real time processing requirement, and thus the memory 7 can be accessed. As a result, the delay in the image data access due to the access contention can be suppressed.

Further, according to this embodiment, in the case where the advance precharge is not executed, the information of the active flag, the row address buffer RAS counter and the PR counter are referred to, and upon occurrence of a page mishit, the precharge and activation can be both executed at the shortest timing within the range meeting the activation-to-precharge minimum cycle number and the precharge-to-activation minimum cycle number.

What is claimed is:

1. A memory controller comprising:
   means for receiving a request for access from a first device to a dynamic random access memory having a data storage area divided into a plurality of banks each divided into a plurality of pages; and
   memory control means for activating a page to be accessed, based on said access request from said first device, and executing, before accessing said activated page, advance precharge of a page to be accessed subsequently by said first device.

2. A memory controller comprising:
   means for receiving a request for access from a first device to a dynamic random access memory having a data storage area divided into a plurality of banks each divided into a plurality of pages; and
   memory control means for activating a page to be accessed, based on said access request from said first device, and executing, before accessing said activated page, advance precharge of a page next to be accessed by said first device.

3. A memory controller comprising:

means for receiving a request for access from a first device to a dynamic random access memory having a data storage area divided into a plurality of banks each divided into a plurality of pages, each page being allocated to a bank different from banks to which pages adjacent to said page are allocated; and memory control means for activating a page of a bank to be accessed, based on said access request from said first device, and executing, before accessing said activated page, advance precharge of a page of the bank to be accessed subsequently by said first device.

4. A memory controller comprising:

means for receiving a request for access from a first device to a dynamic random access memory having a data storage area divided into a plurality of banks each divided into a plurality of pages, each page being allocated to a bank different from banks to which pages adjacent to said page are allocated; and memory control means for activating a page of a bank to be accessed, based on said access request from said first device, and executing, before accessing said activated page, advance precharge of a page of a bank next to be accessed by said first device.

5. A memory controller comprising:

means for receiving a request for access from a first device to a dynamic random access memory having a data storage area divided into a plurality of banks each divided into a plurality of pages, each page being allocated to a bank different from banks to which pages adjacent to said page are allocated; and memory control means for activating a page of a bank to be accessed, based on said access request from said first device, and executing, immediately after said activation, advance precharge of a page of a bank next to be accessed by said first device, said activated page being subsequently accessed by a selected one of a read operation and a write operation.

6. A memory controller connected to at least one processing unit and a dynamic random access memory having a data storage area divided into a plurality of banks each divided into a plurality of pages, each page being allocated to a bank different from banks to which pages adjacent to said page are allocated, said memory controller comprising:

means for receiving a request for access to said dynamic random access memory from said one processing unit; and memory control means for activating a page of a bank to be accessed, based on said access request from said one processing unit, and executing, immediately after said activation, advance precharge of a page of a bank next to be accessed by said one processing unit, said activated page being subsequently accessed by a selected one of a read operation and a write operation.

7. A memory controller according to claim 6, connected to a plurality of processing units, said memory controller further comprising:

access arbitration means for selecting and outputting to said memory control means one of the access requests output from said plurality of said processing units;

wherein in a case where an access higher in priority order than said selected access request is newly input while the access based on said selected access request is under execution by said memory control means, said access arbitration means instructs said memory control means to suspend the access based on said selected access request, said access arbitration means further instructing said memory control means to make an access based on said newly input access request.

8. A memory controller connected to a plurality of processing units and a dynamic random access memory having a data storage area divided into a plurality of banks each divided into a plurality of pages, each page being allocated to a bank different from banks to which pages adjacent to said page are allocated, said memory controller transmitting and receiving data to and from said dynamic random access memory and said plurality of said processing units, said memory controller comprising:

access arbitration means for selecting and outputting one of access requests from said plurality of said processing units in an order of priority;

memory control means for accessing a page of a bank to be accessed, based on said selected access request received from said access arbitration means;

means for determining whether the bank to be accessed is activated or not;

page hit determining means for determining whether the page to be accessed is active;

activation-to-precharge minimum cycle number determining means for determining whether a minimum number of cycles required to execute precharge of said bank to be accessed after activation of said bank to be accessed has passed or not; and precharge-to-activation minimum cycle number determining means for determining whether a minimum number of cycles required to execute activation of said bank to be accessed after precharge of said bank to be accessed has passed or not;

wherein in a case where said bank activation determining means determines that a bank to be accessed is not activated, said memory control means activates the page to be accessed, on condition that an affirmative result is output from said precharge-to-activation minimum cycle number determining means, said memory control means further executing the access by selected one of write operation and read operation after activation of said page to be accessed;

wherein in a case where said bank activation determining means determines that the bank to be accessed is activated, selected one of the write operation and the read operation is executed immediately after an affirmative result is obtained from said page hit determining means;

wherein in a case where said bank activation determining means determines that the bank to be accessed is activated and an affirmative result is obtained from said page hit determining means, said bank to be accessed is precharged and after activation of the page to be accessed, an access is executed by selected one of the write operation and the read operation, on condition that an affirmative result is output from said activation-to-precharge minimum cycle number determining means; and wherein after executing activation of a page next to be accessed, the access to said page is executed by selected one of the write operation and the read operation.

9. A memory control method comprising the steps of:

receiving a request for access from a first device to a dynamic random access memory having a data storage area divided into a plurality of banks each divided into a plurality of pages;

activating a page to be accessed, based on said access request from said first device; and executing an advance precharge of a page subsequently to be accessed by said first device, before accessing said activated page.

10. A memory controller comprising:

means for receiving a request for access from a first device to a dynamic random access memory having a data storage area divided into a plurality of banks each divided into a plurality of pages; and memory control means for activating a page to be accessed, based on said access request from the first device, and executing, at a time period overlapping at least a portion of the time of activating of the page to be accessed, an advance precharge of a page to be accessed subsequently by said first device.

11. A memory controller comprising:

a request receiving unit to receive a request for access from a first device to a dynamic random access memory having a data storage area divided into a plurality of banks each divided into a plurality of pages; and a memory control unit coupled to receive an output of the request receiving unit to activate a page to be accessed, based on the access request from the first device, and to execute, at a time period overlapping at least a portion of the time of the activation of the page to be accessed, an advance precharge of a page to be accessed subsequently by said first device.

12. A memory controller comprising:

a request receiving unit to receive an access request from a first device to a dynamic random access memory having a data storage area divided into a plurality of banks each divided into a plurality of pages; and a memory control unit to activate a page to be accessed, based on said access request from said first device, and to execute, before accessing said activated page, advance precharge of a page to be accessed subsequently by said first device.

13. A memory control method comprising the steps of:

receiving a request for access from a first device to a dynamic random access memory having a data storage area divided into a plurality of banks each divided into a plurality of pages;

activating a page to be accessed, based on said access request from said first device; and executing an advance precharge of a page to be subsequently accessed by the first device during a time overlapping at least a portion of a time of accessing said activated page.

* * * * *